US010446169B1

(12) United States Patent
Kamdar et al.

(10) Patent No.: US 10,446,169 B1
(45) Date of Patent: Oct. 15, 2019

(54) PRE-SELECTABLE AND DYNAMIC CONFIGURABLE MULTISTAGE ECHO CONTROL SYSTEM FOR LARGE RANGE LEVEL OF ACOUSTIC ECHO

(71) Applicant: MOTOROLA MOBILITY LLC, Chicago, IL (US)

(72) Inventors: Pratik M. Kamdar, Naperville, IL (US); Jincheng Wu, Naperville, IL (US); Joel A. Clark, Woodridge, IL (US)

(73) Assignee: Motorola Mobility LLC, Chicago, IL (US)

( * ) Notice: Subject to any disclaimer, the term of this patent is extended or adjusted under 35 U.S.C. 154(b) by 0 days.

(21) Appl. No.: 15/935,204

(22) Filed: Mar. 26, 2018

(51) Int. Cl.
*G10L 21/0208* (2013.01)
*G10K 11/16* (2006.01)

(52) U.S. Cl.
CPC .......... *G10L 21/0208* (2013.01); *G10K 11/16* (2013.01); *G10L 2021/02082* (2013.01)

(58) Field of Classification Search
CPC ...... G10L 21/0208; G10L 2021/02082; G10K 11/16; H04B 3/20; H04M 3/002; H04M 9/082; H04M 9/08
USPC ................ 381/66, 317, 318, 63; 379/406.01, 379/406.05, 390.02, 390.01, 392.01, 379/395.01
See application file for complete search history.

(56) References Cited

U.S. PATENT DOCUMENTS

2014/0126745 A1* 5/2014 Dickins .................. H04R 3/002
381/94.3
2014/0307882 A1* 10/2014 LeBlanc ................ H04S 7/305
381/66

OTHER PUBLICATIONS

Buchner, H., et al., "An Efficient Combination of Multi-Channel Acoustic Echo Cancellation With a Beamforming Microphone Array", International Workshop on Hands-Free Speech Communication (HSC2001) Kyoto, Japan Apr. 9-11, 2001.

* cited by examiner

*Primary Examiner* — Thjuan K Addy
(74) *Attorney, Agent, or Firm* — Yudell Isidore PLLC

(57) ABSTRACT

A method for controlling echo of a voice recognition system includes receiving at least two audio input signals corresponding to sound sensed by at least two microphones in a physical space. A first audio input signal of the at least two audio input signals is received on a primary channel, and each remaining audio input signal is received through a respective secondary channel. The method includes selecting, by a processor, based on an echo power level of a speaker in the physical space, a subset of echo control functions (ECFs) from among a plurality of ECFs of a multistage echo control system. Each ECF modifies the at least two audio input signals to reduce echo. The method includes generating a corresponding number of audio output signals by processing the signals received on the primary and secondary channels through the selected subset of ECFs, and outputting the audio output signals.

20 Claims, 8 Drawing Sheets

PRE-SELECTABLE AND DYNAMIC CONFIGURABLE MULTISTAGE ECHO CONTROL SYSTEM FOR LARGE RANGE LEVEL OF ACOUSTIC ECHO

BACKGROUND

1. Technical Field

The present disclosure generally relates to electronic devices with audio speakers and microphones, and more particularly to acoustic echo cancellation systems for voice signal processing by such electronic devices.

2. Description of the Related Art

Mobile devices such as, smart phones, tablets, laptops or other electronic devices, oftentimes include voice recognition (VR) systems to provide hands free voice control of the device. Although VR technologies have been improving, accurate voice recognition remains a technical challenge. For example, during device playback, users try to interact with the device by saying a trigger phase or command to instruct the device to pause the playback and perform another task. The user expects the VR engine to recognize the user's speech, distinguish the user's speech from the playback, and to respond quickly and correctly. However, in part due to the small form factor of the mobile device, the echo signal detected by the mobile device's microphone is much larger in amplitude compared to the user's speech level. Consequently, there is a problem in that the user's speech signal is masked by the echo signal (i.e., the speech to echo ratio (SER) can be more than −30 dB), making it difficult to be heard by the mobile device. There is a problem in that a conventional acoustic echo canceller (AEC) of a mobile device cannot cancel an SER that is greater than 30 dB, and thus, the speech of a user is often unrecognized or mis-recognized by the VR engine.

BRIEF DESCRIPTION OF THE DRAWINGS

The description of the illustrative embodiments is to be read in conjunction with the accompanying drawings. It will be appreciated that for simplicity and clarity of illustration, elements illustrated in the figures have not necessarily been drawn to scale. For example, the dimensions of some of the elements are exaggerated relative to other elements. Embodiments incorporating teachings of the present disclosure are shown and described with respect to the figures presented herein, in which.

DETAILED DESCRIPTION

Figure 1:
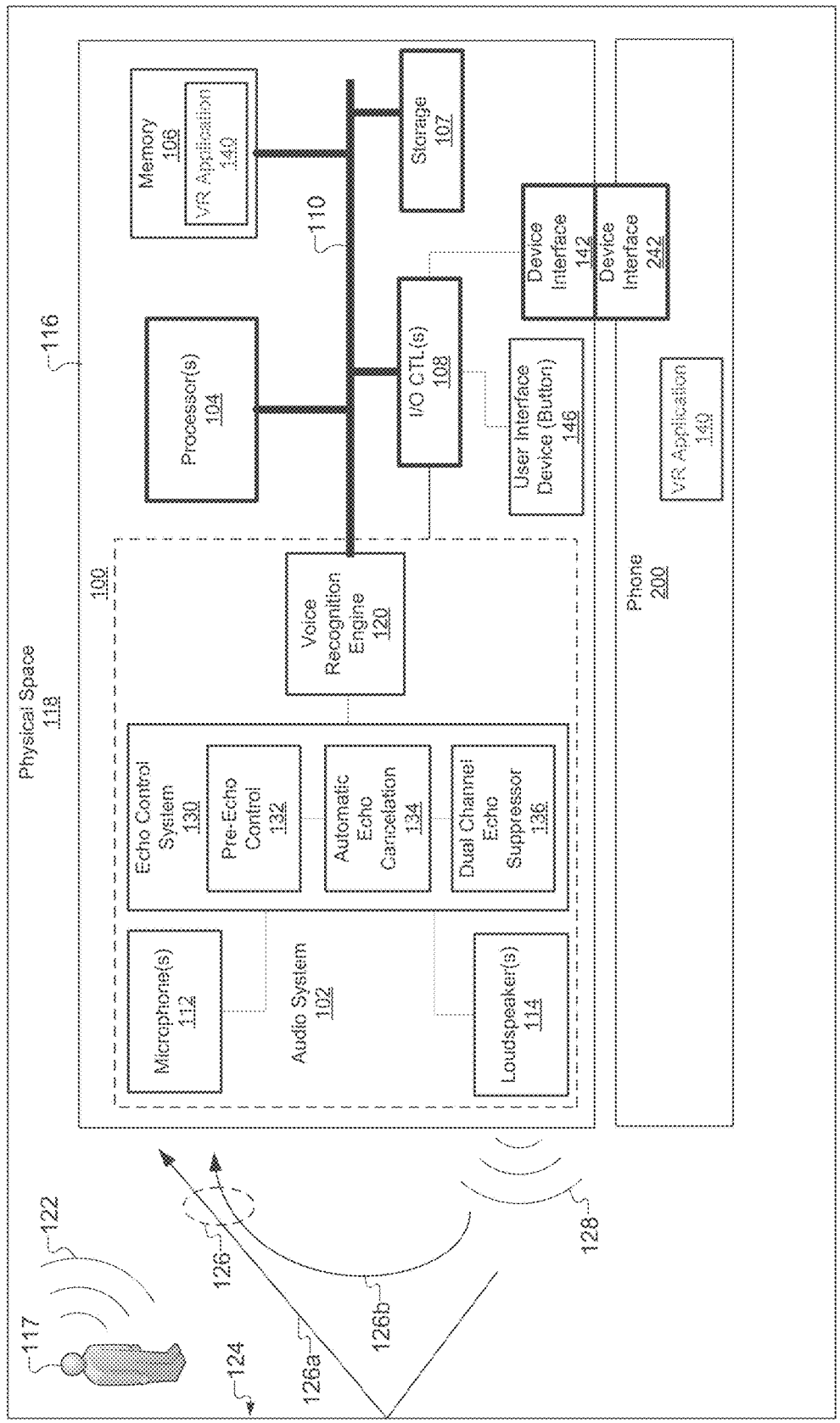
FIG. 1 illustrates a block diagram representation of an example data processing system within which certain aspects of the disclosure can be practiced, in accordance with one or more embodiments of this disclosure.

Disclosed are a method, an electronic device, and a computer program product for controlling echo of a voice recognition system. The method includes receiving at least two audio input signals corresponding to sound sensed by at least two microphones in a physical space. A first audio input signal of the at least two audio input signals is received on a primary channel, and each remaining audio input signal of the at least two audio input signals is received through a respective secondary channel. The method includes selecting, by a processor, based on an echo power level of a speaker in the physical space, a subset of echo control functions from among a plurality of echo control functions of a multistage echo control system (MS-ECS). Each echo control function modifies the at least two audio input signals to reduce echo. The method includes generating a corresponding number of audio output signals by processing the signals received on the primary and secondary channels through the selected subset of echo control functions. The method includes outputting the corresponding number of audio output signals. According to various embodiments of this disclosure, the plurality of echo control functions includes a pre-echo control filter (PreEC) that filters a nonlinear echo path caused by the speaker by applying a cross-filtering algorithm to the at least two audio input signals to, at least in part, generate the corresponding number of audio output signals.

According to another embodiment, a data processing device includes at least two microphones that generate at least two audio input signals, in response to sensing sound in a physical space. The data processing device includes a speaker that outputs playback sound into the physical space at an actual playback power based on a playback volume step of the speaker. The data processing device includes a processor, operably coupled to the at least two microphones and the speaker. The processor also executes program code that enables the device to receive at least two audio input signals corresponding to sound sensed by the at least two microphones in a physical space. A first audio input signal of the at least two audio input signals is received through a primary channel, and each remaining audio input signal of the at least two audio input signals is received through a respective secondary channel. The processor also executes program code that enables the device to select, based on an echo power level of a speaker in the physical space, a subset of echo control functions from among a plurality of echo control functions of a MS-ECS. Each echo control function among the plurality of echo control functions modifies the at least two audio input signals to reduce echo. The processor also executes program code that enables the device to generate a corresponding number of audio output signals by processing the signals received through primary and secondary channels through the selected subset of echo control functions. The processor also executes program code that enables the device to output the corresponding number of audio output signals.

According to the present disclosure, an electronic device configured for audio signal processing and playback selectively performs various combinations of either one, two, or three of: echo filtering; echo cancellation; and echo suppression. The embodiments of the present disclosure provide a MS-ECS that can effectively filter, cancel, and suppress echo while retaining speech quality, which can then be successfully processed by a voice recognition (VR) engine. According to embodiments of this disclosure, the MS-ECS attenuates, cancels, and suppresses more (linear and non-linear) echo than a conventional acoustic echo canceller, and thus, input to the VR engine will have much less residual echo. By reducing residual echo in the input to the VR engine, embodiments of this disclosure enable VR performance to be greatly improved, including providing a lower occurrence of false triggers, a lower occurrence of missed recognition of user speech, and more accurate response.

In the following description, specific example embodiments in which the disclosure may be practiced are described in sufficient detail to enable those skilled in the art to practice the disclosed embodiments. For example, specific details such as specific method sequences, structures, elements, and connections have been presented herein. However, it is to be understood that the specific details presented need not be utilized to practice embodiments of the present disclosure. It is also to be understood that other embodiments may be utilized and that logical, architectural, programmatic, mechanical, electrical and other changes may be made without departing from general scope of the disclosure. The following detailed description is, therefore, not to be taken in a limiting sense, and the scope of the present disclosure is defined by the appended claims and equivalents thereof.

References within the specification to "one embodiment," "an embodiment," "embodiments", or "alternate embodiments" are intended to indicate that a particular feature, structure, or characteristic described in connection with the embodiment is included in at least one embodiment of the present disclosure. The appearance of such phrases in various places within the specification are not necessarily all referring to the same embodiment, nor are separate or alternative embodiments mutually exclusive of other embodiments. Further, various features are described which may be exhibited by some embodiments and not by others. Similarly, various aspects are described which may be aspects for some embodiments but not other embodiments.

The terminology used herein is for the purpose of describing particular embodiments only and is not intended to be limiting of the disclosure. As used herein, the singular forms "a", "an", and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. Moreover, the use of the terms first, second, etc. do not denote any order or importance, but rather the terms first, second, etc. are used to distinguish one element from another.

It is understood that the use of specific component, device and/or parameter names and/or corresponding acronyms thereof, such as those of the executing utility, logic, and/or firmware described herein, are for example only and not meant to imply any limitations on the described embodiments. The embodiments may thus be described with different nomenclature and/or terminology utilized to describe the components, devices, parameters, methods and/or functions herein, without limitation. References to any specific protocol or proprietary name in describing one or more elements, features or concepts of the embodiments are provided solely as examples of one implementation, and such references do not limit the extension of the claimed embodiments to embodiments in which different element, feature, protocol, or concept names are utilized. Thus, each term utilized herein is to be provided its broadest interpretation given the context in which that term is utilized.

Those of ordinary skill in the art will appreciate that the hardware components and basic configuration depicted in the following figures may vary. For example, the illustrative components within the presented devices are not intended to be exhaustive, but rather are representative to highlight components that can be utilized to implement the present disclosure. For example, other devices/components may be used in addition to, or in place of, the hardware depicted. The depicted example is not meant to imply architectural or other limitations with respect to the presently described embodiments and/or the general disclosure.

Within the descriptions of the different views of the figures, the use of the same reference numerals and/or symbols in different drawings indicates similar or identical items, and similar elements can be provided similar names and reference numerals throughout the figure(s). The specific identifiers/names and reference numerals assigned to the elements are provided solely to aid in the description and are not meant to imply any limitations (structural or functional or otherwise) on the described embodiments.

FIG. 1 illustrates a block diagram representation of an example data processing system (DPS) 100 including an audio system 102 and within which one or more of the described features of the various embodiments of the disclosure can be implemented. Data processing system 100 may be, for example, a smart speaker modular-attachment, smart speaker, smartphone, tablet, handheld device, personal computer, a server, a network storage device, or any other suitable device, and the DPS 100 may vary in size, shape, performance, functionality, and price.

Referring specifically to FIG. 1, example DPS 100 includes one or more processor(s) 104 coupled via system interconnect 110 to audio system 102, memory 106, storage 107, and one or more input/output (I/O) controllers 108. System interconnect 110 can be interchangeably referred to as a system bus, in one or more embodiments.

Figure 2:
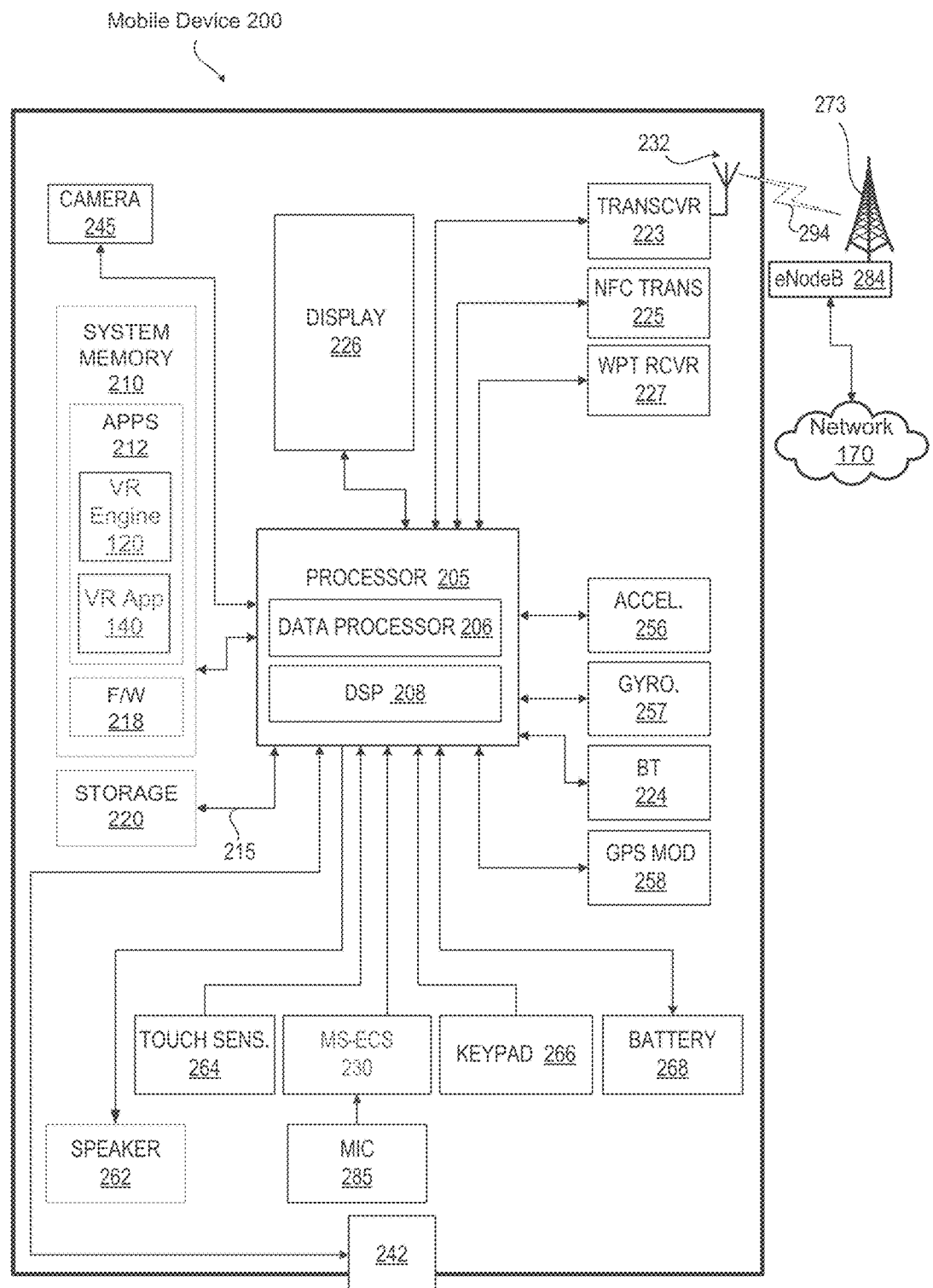
FIG. 2 illustrates a mobile device within which certain aspects of the disclosure can be practiced, in accordance with one or more embodiments of this disclosure.
Figure 3:
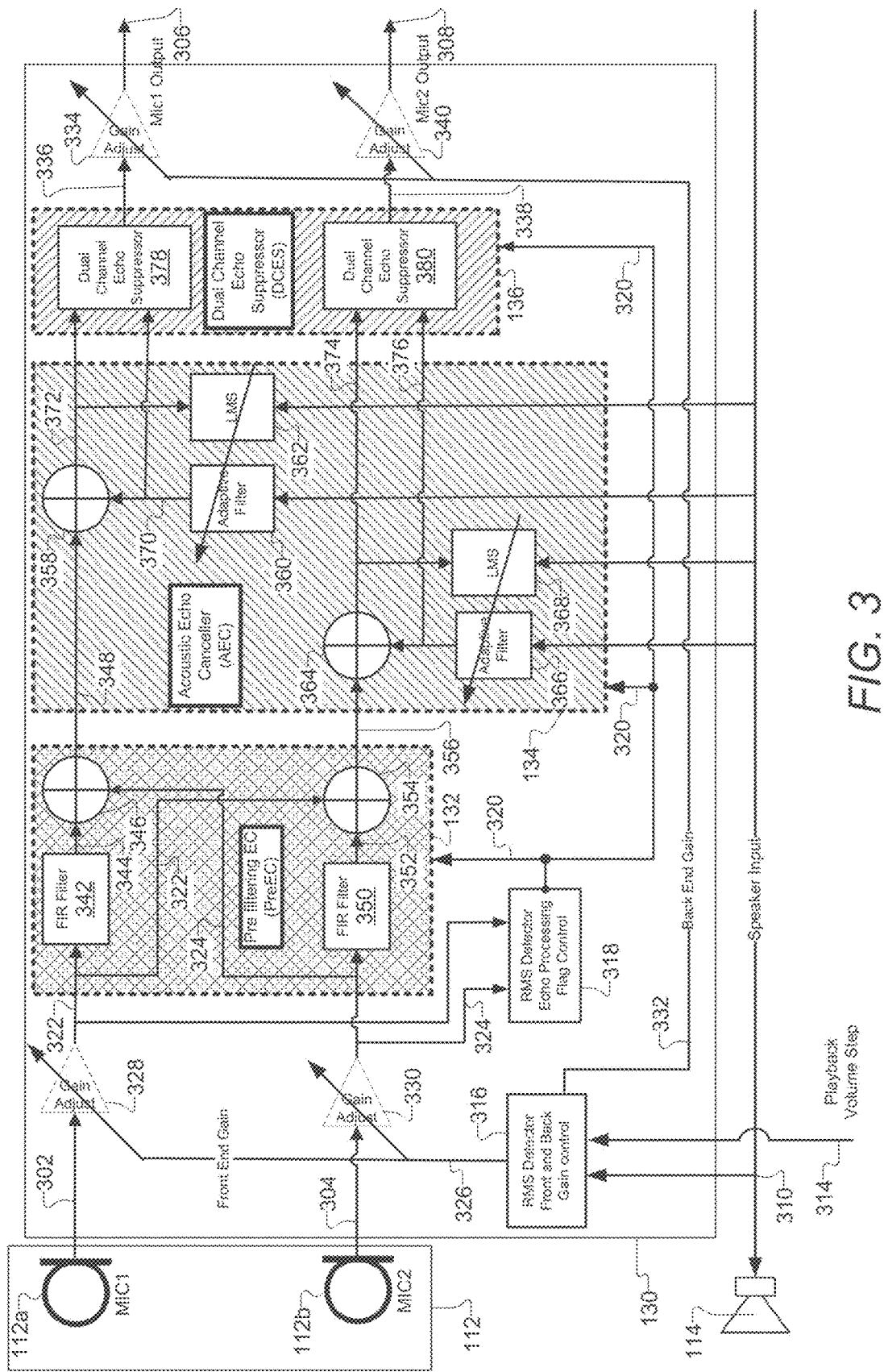
FIG. 3 illustrates a pre-selectable and dynamic configurable multistage echo control system for large range levels of acoustic echo, in accordance with one or more embodiments of this disclosure.

Audio system 102 includes a group of N microphones 112 and one or more speakers 114. N represents an integer number that is greater than 1, and the N microphones 112 includes two of more microphones. More particularly, the N microphones 112 includes one primary microphone and a remaining number (i.e., N−1) of secondary microphones. The primary microphone is operably coupled to a primary channel and each secondary microphone is operably coupled to a respective secondary channel. The microphone(s) 112 and speaker(s) 114 can be closely positioned within a device enclosure 116. The device enclosure 116 may have a small form factor, which is an attractive feature for users who desire portability of their device. A user 117, who may be several meters away from DPS 100 within a physical space 118, can interact with and control DPS 100 via a voice recognition (VR) engine 120. The physical space 118 can be an indoor or outdoor space, which may include, for example, one or more fully or partially enclosed areas, an open area without enclosure, and the like. The physical space 118 can be, or can include, an interior of a room, multiple rooms, a building, or the like. For example, the microphone(s) 112 is in the same physical space (e.g., room) as the speaker(s) 114 and the arrangement of objects in the physical space (e.g., room) while the microphone(s) senses sound is the same as while the speaker(s) 114 outputs sound. When the user 117 speaks aloud, the primary voice path 122 from the user 117 can mix with path(s) of another sound(s). For example, speaker output 128 (e.g., music playback sound, audiobook playback sound, voice call sound) from speaker(s) 114 can traverse linear and nonlinear echo paths 126a and 126b respectively to generate audio interference 126 (also referred to as "acoustic echo"). When the speaker(s) 114 is set to its maximum volume step, speaker output 128 may reach the maximum volume capability of speaker(s) 114 and will generate very high audio interference 126 into microphone(s) 112, depending on actual power of speaker input 310 (FIG. 3). More particularly, speaker output 128 may reflect off reflective surface 124, forming one or more echo path(s) that has a time varying delay and magnitude. While speaker(s) 114 outputs sound into physical space 118, user 117 may speak aloud to DPS 100 such that primary voice path 122 mixes with audio interference 126. For example, while speaker(s) 114 projects playback music into physical space 118, user 117 may speak aloud a trigger word or trigger phrase (e.g., "Alexa") followed by a voice command (e.g., "stop playback" or "lower the volume"). In addition, "double talk" may occur when primary voice path 122 reflects off a reflective surface 124 (e.g., a wall within the physical space 118) and mixes with an echo voice path (not illustrated) that has a time varying delay and magnitude. Audio interference 126 can prevent VR engine 120 from recognizing that sound detected by microphones 112 includes speech from user 117. Accordingly, audio interference 126 can prevent VR engine 120 from successfully interpreting spoken words sensed by the microphone(s) 112. In some instances, the echo level (i.e., magnitude) of audio interference 126 is more than 30 dB higher than the user speech level. Audio interference 126 can also mix with the user's spoken words such that the sound sensed by the microphone(s) 112, which is transmitted by a communication module (such as mobile device 200 of FIG. 2), becomes processed to the VR engine 120 and played back by the speaker(s) 114 as a nonsensical phrase. In audio system 102, a multistage echo control system (MS-ECS) 130 can effectively filter, cancel, and suppress echo levels, while retaining speech quality (of received speech input) in order generate a quality audio signal to be successfully processed by the VR engine.

In audio system 102, a group of at least two microphones 112 provide microphone outputs that are operatively coupled to MS-ECS 130. That is, MS-ECS 130 receives and processes at least two audio input signals corresponding to sound sensed by microphones 112 in physical space 118, and MS-ECS 130 outputs a corresponding number of audio output signals to VR engine 120. MS-ECS 130 can attenuate, suppress, cancel more (linear and non-linear) echo than a conventional acoustic echo canceller, thus the input to VR engine 120 will have much less residual echo so that VR performance will be greatly improved (i.e., less false trigger, less missed recognition, and more accurate response). MS-ECS 130 includes a plurality of echo control functions (also referred to as "processing stages" of "stages"), including: a pre-echo control filter (PreEC) 132 that, in an attenuating manner, filters nonlinear echo path 126b applying a cross-filtering algorithm; an acoustic echo cancellation (AEC) 134 that cancels echo using adaptive filter based (AF-based) AEC methods; and a dual channel echo suppressor (DCES) 136 that suppresses residual echo. Details of PreEC 132, AEC 134, and DCES 136 are described with reference to FIG. 3. MS-ECS 130 can handle a large range of echo levels, from very low (e.g., −12 dB or less) to very high (e.g., 30 dB or more). In the example shown, the three echo control functions 132, 134, and 136 of MS-ECS 130 can be configured as various combinations of either one, two, or three function(s) enabled. For example, MS-ECS 130 selectively enables all three echo control functions for handling very high level raw echo, enables two echo control functions for handling medium level raw echo, and enables one echo control function for some cases when the echo level has dropped to a very low or minimum level. The pre-selection of which echo control function(s) belong to which subset is based on user case or dynamic configuration based on the echo level. Thus, MS-ECS 130 optimizes computation complexity and power consumption, which is a technical advantage for portable devices.

MS-ECS 130 can handle echo levels greater than the capability of conventional mobile devices. Conventional mobile devices include an AEC. The conventional AEC models the acoustic path between speaker output and microphone input with a linear filter and subtracts the echo replica from the microphone input signal. Using this conventional method, the best attenuation is about 25 dB-30 dB if the system is operating close to a linear situation, which is rarely the case with a speaker and microphone system. The problem of user's speech signal being masked by loud speaker echo signal is made more acute for small form electronic devices, such as speakerphones that produce high sound pressure levels while incorporating voice control. The effects caused by nonlinearity and vibrations cannot be modeled completely by linear filters. With these smaller user devices, the echo level is more than 30 dB higher than the user speech level, and consequently, the residual echo level after voice signal processing is still a major challenge in conventional mobile devices performing VR. As described in this disclosure, MS-ECS 130 provides solutions to shortcomings of conventional mobile devices.

Table 1 shows examples of echo power levels and subsets of pre-selected echo control functions enabled to handle various echo power levels, in accordance with one or more embodiments of this disclosure. Table 2 shows examples of echo power levels and subsets of pre-selected echo control functions for specific other use cases, in accordance with one or more embodiments of this disclosure. MS-ECS 130 is configured to use Table 1 to dynamically select a subset of echo control functions based on an echo power level. In certain embodiments, in addition to selecting a subset of echo control functions based on an echo power level, MS-ECS 130 can be further configured to select a subset of echo functions from a particular table based on the use case. For example, MS-ECS 130 could be configured to select from Table 1 when DPS 100 is used for music playback and to select from Table 2 in specific other use cases (e.g., audiobook playback or voice call). Table 1 and Table 2 are provided as examples only, and it is understood that different tables of various subsets and different selection criteria can be used.

TABLE 1

| Subset | Echo Power Level (RMS range) | Flag PreEC | AEC | DCES |
|---|---|---|---|---|
| 1 | Low (≤−12 dB) | OFF | ON | OFF |
| 2 | Medium (≤−6 dB and >−12 dB) | OFF | ON | ON |
| 3 | High (>−6 dB) | ON | ON | ON |

TABLE 2

| Subset | Echo Power Level (RMS range) | Flag PreEC | AEC | DCES |
|---|---|---|---|---|
| 4 | Low (low RMS range) | ON | OFF | OFF |
| 5 | Medium (medium RMS range) | ON | ON | OFF |
| 6 | High (high RMS range) | ON | ON | ON |

As shown in FIG. 1, system memory 106 can include therein a plurality of software and/or firmware modules including VR application 140. VR application 140 may be provided as an application that is optionally located within the system memory 106 and executed by processor 104. VR application 140 performs the functions of receiving and processing voice recognition achieved by the VR engine 120, and thus indirectly rely upon echo cancellation achieved by the MS-ECS 130. In certain embodiments, VR application 140 is also stored, or alternatively instead stored within a mobile device 200 and executed by a processor associated with mobile device 200. Additionally, MS-ECS 130 may be provided as an application that is optionally located within the system memory 106 and executed by processor 104. Within this embodiment, processor 104 executes MS-ECS 130 to provide the various methods and functions described herein. Additional aspects of MS-ECS 130, and functionality thereof, are presented within the description of FIGS. 3-5. According to various embodiments of this disclosure, MS-ECS 130 could be an independent application, a system application, or a part of the system itself. Also, system memory 106 can include therein additional application(s), operating system (O/S), basic input/output system/unified extensible firmware interface (BIOS/UEFI) and other firmware (F/W).

In one embodiment, storage 107 can be a hard drive or a solid-state drive. The one or more software and/or firmware modules within storage 107 can be loaded into system memory 106 during operation of DPS 100. The various software and/or firmware modules have varying functionality when their corresponding program code is executed by processor(s) 104 or other processing devices within DPS 100.

DPS 100 further includes one or more input/output (I/O) controllers 108, which support connection by, and processing of signals from, one or more connected input device(s), such as a keyboard, mouse, touch screen, or microphone 112. I/O controllers 130 also support connection to and forwarding of output signals to one or more connected output devices, such as a display, audio speaker(s) 114, or a set of light emitting diodes (LEDs).

Additionally, in one or more embodiments, one or more device interface(s) 142, such as an optical reader, a universal serial bus (USB), a card reader, Personal Computer Memory Card International Association (PCMIA) slot, and/or a high-definition multimedia interface (HDMI), can be coupled to I/O controllers 108 or otherwise associated with DPS 100. Device interface(s) 142 can be utilized to enable DPS 100 to physically couple (e.g., establishing wired paths of communication) to a mating device interface 242 of mobile device 200, or to enable data to be read from or stored to additional devices (not shown) for example a compact disk (CD), digital video disk (DVD), flash drive, or flash memory card. In one or more embodiments, device interface(s) 142 can further include General Purpose I/O interfaces, such as an Inter-Integrated Circuit ($I^2C$) Bus, System Management Bus (SMBus), and peripheral component interconnect (PCI) buses.

In one or more embodiments, DPS 100 includes one or more user interface device(s) 146, such as a button that can be pressed by a user to trigger DPS 100 to commence voice recognition processing.

In the description of the following figures, reference is also occasionally made to specific components illustrated within the preceding figures, utilizing the same reference numbers from the earlier figures. With reference now to FIG. 2, there is illustrated example mobile device 200 within which certain aspects of the disclosure can be practiced, in accordance with one or more embodiments of this disclosure. The embodiment of mobile device 200 illustrated in FIG. 2 is for illustration only, and DPS 100 of FIG. 1 could have the same or similar configuration.

Mobile device 200 includes at least one processor integrated circuit, processor 205. Included within processor 205 are data processor 206 and digital signal processor (DSP) 208. Processor 205 is coupled to system memory 210 and non-volatile storage 220 via a system communication mechanism, such as system interconnect 215. System interconnect 215 can be interchangeably referred to as a system bus, in one or more embodiments. One or more software and/or firmware modules can be loaded into system memory 210 during operation of mobile device 200. Specifically, in one embodiment, system memory 210 can include therein a plurality of such modules, including firmware (F/W) 218. System memory 210 may also include basic input/output system and an operating system (not shown). The software and/or firmware modules provide varying functionality when their corresponding program code is executed by processor 205 or by secondary processing devices within mobile device 200.

Processor 205 supports connection by and processing of signals from one or more connected input devices such as camera 245, speaker 262, touch sensor 264, microphone 285, keypad 266, and display 226. Additionally, in one or more embodiments, one or more device interfaces 242, such as an optical reader, a universal serial bus (USB), a card reader, Personal Computer Memory Card International Association (PCMIA) slot, and/or a high-definition multimedia interface (HDMI), can be associated with mobile device 200. Mobile device 200 also contains a power source such as a battery 268 that supplies power to mobile device 200.

Mobile device 200 further includes Bluetooth transceiver 224, global positioning system module (GPS MOD) 258, gyroscope 257, and accelerometer 256, all of which are communicatively coupled to processor 205. Bluetooth transceiver 224 enables mobile device 200 and/or components within mobile device 200 to communicate and/or interface with other devices, services, and components that are located external to mobile device 200. GPS MOD 258 enables mobile device 200 to communicate and/or interface with other devices, services, and components to send and/or receive geographic position information. Gyroscope 257 communicates the angular position of mobile device 200 using gravity to help determine orientation. Accelerometer 256 is utilized to measure non-gravitational acceleration and enables processor 205 to determine velocity and other measurements associated with the quantified physical movement of mobile device.

Mobile device 200 is presented as a wireless communication device. As a wireless device, mobile device 200 can transmit data over wireless network 170. Mobile device 200 includes transceiver 223, which is communicatively coupled to processor 205 and to antenna 232. Transceiver 223 allows for wide-area or local wireless communication, via wireless signal 294, between mobile device 200 and evolved node B (eNodeB) 284, which includes antenna 273. Mobile device 200 is capable of wide-area or local wireless communication with other mobile wireless devices or with eNodeB 284 as a part of a wireless communication network. Mobile device 200 communicates with other mobile wireless devices by utilizing a communication path involving transceiver 223, antenna 232, wireless signal 294, antenna 273, and eNodeB 284. Mobile device 200 additionally includes near field communication transceiver (NFC TRANS) 225 and wireless power transfer receiver (WPT RCVR) 227. In one embodiment, other components within mobile device 200 utilize antenna 232 to send and/or receive signals in the form of radio waves. For example, GPS module 258 can be communicatively coupled to antenna 232 to send/and receive location data.

As provided by FIG. 2, mobile device 200 additionally includes MS-ECS 230 and VR application 140. VR application 140 may be provided as an application that is optionally located within the system memory 210 and executed by processor 205. Within this embodiment, processor 205 executes VR application 140 to receive and process voice recognition achieved by a VR engine (such as VR engine 120), and thus indirectly rely upon echo cancellation achieved by the MS-ECS 130. In at least one embodiment, mobile device 200 includes VR engine 120, which may be a component of, may be combined with, or may be incorporated within one or more applications 212. Additionally, MS-ECS 230 may be provided as an application that is optionally located within the system memory 210 and executed by processor 205. Within this embodiment, processor 205 executes MS-ECS 230 to provide the various methods and functions described herein. It is, however, understood that, in at least one embodiment, MS-ECS 230 may be a component of, may be combined with, or may be incorporated within one or more applications 212. In at least one embodiment, MS-ECS 230 may take the form of an entirely hardware embodiment or take the form of a combination of software and hardware aspects, which may be generally referred to herein as an MS-ECS module that operates similar to MS-ECS 130 of FIG. 1.

With reference now to FIG. 3, there is illustrated a pre-selectable and dynamically configurable MS-ECS 130 for large range levels of acoustic echo, in accordance with one or more embodiments of this disclosure. The embodiment of MS-ECS 130 illustrated in FIG. 3 is for illustration only, and MS-ECS 130 of FIG. 1 and MS-ECS 230 of FIG. 2 could have the same or similar configuration.

For the example MS-ECS 130 shown in FIG. 3, the group of N microphones 112 includes at least one pair of microphones, each pair including a primary microphone 112a and secondary microphone 112b. In some embodiments, the group of N microphones 112 includes multiple pairs of microphones, and DPS 100 includes one MS-ECS 130 per pair of microphones. The N microphones 112 sense sound within surrounding physical space (e.g., physical space 118, FIG. 1) and generate a corresponding number (i.e., N) of microphone outputs in response. The N microphone outputs generated by microphones 112 are provided to MS-ECS 130 as N audio input signals 302 and 304 respectively via a primary channel and secondary channel respectively.

MS-ECS 130 receives a first audio input signal 302 via the primary channel and receives a second audio input signal 304 via a secondary channel. MS-ECS 130 processes the signals received via the primary and secondary channels through a selected subset of echo control functions that are enabled, in order to generate N audio output signals. More particularly, MS-ECS 130 generates a first audio output signal 306 by processing signals received via the primary channel, and then outputs the first audio output signal 306 via the primary channel. MS-ECS 130 generates a second audio output signal 308 by processing signals received via the secondary channel, and then outputs the second audio output signal 308 via the secondary channel. That is, MS-ECS 130 outputs N audio output signals (i.e., first and second audio output signals 306 and 308) to VR engine 120 (FIG. 1), which receives the N audio output signals as inputs.

In order to generate first and second audio output signals 306 and 308, MS-ECS 130 selects a subset of echo control functions from among the plurality of echo control functions, and enables each echo control function within the selected subset to processing the signals received on the primary and secondary channels. In the example shown, the plurality of echo control functions of MS-ECS 130 includes PreEC 132, AEC 134, and DCES 136. The MS-ECS 130 uses an echo power level as a basis for selecting which subset of echo control functions to enable. In certain embodiments, MS-ECS 130 additionally uses an echo property as a basis for selecting which subset of echo control functions to enable. A specific use-case is an example of an echo property. MS-ECS 130 can determine the specific use-case based on a noise-type tag that indicates the type of sound (e.g., music playback, audiobook playback, voice call) the speaker input 310 contains. That is, the speaker input 310 can contain a noise-type tag in addition to containing an electrical audio signal.

MS-ECS 130 determines the echo power level of speaker(s) 114 in the physical space 118. The echo power level can be determined according to various methods, such as a method that determines the peak Root Means Square (RMS) value of audio input signals received from at least two microphones 112, or alternatively, a method that determines a playback RMS value of the speaker(s) 114. That is, the speaker(s) 114 outputs speaker output 128 (e.g., playback sound) by converting the electrical audio signal of the speaker input 310 into a corresponding sound. More particularly, the speaker(s) 114 outputs speaker output 128 according to a playback volume step 314 and the actual playback power of the speaker input 310. For example, the actual playback power of the speaker input 310 can be the magnitude of the speaker input 310 relative to a reference volume level (i.e., sound pressure level (SPL)). The volume step 314 is a setpoint selected by the user from a range of volume setpoints, which may range from a minimum SPL output of the speaker(s) 114 to a maximum SPL output of the speaker(s) 114. For example, DPS 100 may include an actuator (e.g., volume control knob, keyboard volume hotkey, mouse wheel rotation) that, when actuated by the user, changes the user-selected volume step 314 and correspondingly increases or decreases the loudness of speaker output 128. MS-ECS 130 includes an RMS Detector Front and Back Gain Controller 316 that receives playback volume step 314, detects actual playback power of the speaker input 310, and determines the echo power level of speaker(s) 114. In determining the echo power level of speaker(s) 114, RMS Detector Front and Back Gain Controller 316 applies an RMS algorithm to the actual power of the electrical audio signal of the speaker input 310 based on the received playback volume step 314. More particularly, RMS Detector Front and Back Gain Controller 316 may be programmed (e.g., by software) to perform one or more operations (e.g., determining and comparing a peak RMS value, etc.) in the example process 600 of FIG. 6.

MS-ECS 130 includes RMS Detector Echo Processing Flag Controller 318 that selects a subset of echo control functions to enable and generates corresponding flag control signal(s) 320 as output to the PreEC 132, AEC 134, and DCES 136. In some embodiments, RMS Detector Echo Processing Flag Controller 318 selects "on-the-fly" which echo control functions to enable as a subset and generates corresponding flag control signal(s) 320 as output that is received as an input by PreEC 132, AEC 134, and DCES 136. The term "on-the-fly" means dynamically, such as by selecting which echo control function(s) through which to process the signals received on the primary and secondary channels while MS-ECS 130 is still continuing to receive the signals to be processed by the selected echo control function(s), and automatically selecting different echo control function(s) according to changes in echo power level. That is, in some embodiments, the subset of echo control functions is formed "on-the-fly," and in other embodiments, the subset is selected from a plurality of pre-formed subsets (such as in Table 1 or Table 2) containing pre-selected echo control functions. In RMS Detector Echo Processing Flag Controller 318, the selection of which subset of echo control functions to enable is based on the echo power level, which is determined based on the first front-end-gain-adjusted audio input signal 322 received via the primary channel and on the front-end-gain-adjusted audio input signal 324 received via the secondary channel.

In at least one embodiment, RMS Detector Echo Processing Flag Controller 318 can be configured to store various subsets of pre-selected echo control functions, such as storing the subsets of Table 1, Table 2, and the like, as discussed above. RMS Detector Echo Processing Flag Controller 318 is configured to select one subset from among the various subsets of pre-selected echo control functions, based on whether the echo power level is within a predetermined range of RMS values that correspond to that one subset. For example, in response to a determination that the echo power level is within a predetermined low range of RMS values, Subset 1 of Table 1 is selected. Additionally, RMS Detector Echo Processing Flag Controller 318 generates corresponding flag control signal(s) 320 that enables or otherwise turns ON the AEC 134 and that disables or otherwise turns OFF the PreEC 132 and DCES 136. In response to a determination that the echo power level is within a predetermined medium range of RMS values, Subset 2 of Table 1 is selected, and RMS Detector Echo Processing Flag Controller 318 generates corresponding flag control signal(s) 320 that enables or otherwise turns ON the AEC 134 and DCES 136 and that disables or otherwise turns OFF the PreEC 132. In response to a determination that the echo power level is within a predetermined high range of RMS values, Subset 3 of Table 1 is selected, and RMS Detector Echo Processing Flag Controller 318 generates corresponding flag control signal(s) 320 that enables or otherwise turns ON the PreEC 132, AEC 134 and DCES 136, such that no echo control function is disabled or otherwise turned OFF.

In order to prevent audio interference 126 from saturating microphones 112 (which undesirably generates nonlinear components of audio signals), MS-ECS 130 adjusts the front end gain for each channel according to a front end gain control value 326 set by RMS Detector Front and Back Gain Controller 316. The front end gain control value 326 reduces the strength of the raw signal received by microphones 112 in order to keep the audio signal in the non-saturation domain. That is, in response to receiving first audio input signal 302 via the primary channel, front end gain adjuster 328 generates the front-end-gain-adjusted audio input signal 322 by applying the front end gain control value 326 to first audio input signal 302. Similarly, in response to receiving second audio input signal 304 via the secondary channel, front end gain adjuster 330 generates the front-end-gain-adjusted audio input signal 324 by applying the front end gain control value 326 to second audio input signal 304.

In order to reduce signal fluctuations, MS-ECS 130 (FIG. 1) adjusts the back end gain for each channel according to a back end gain control value 332 set by RMS Detector Front and Back Gain Controller 316. RMS Detector Front and Back Gain Controller 316 reverses the effect of the front end gain adjustment and restores signal strength by setting back end gain control value 332 to be substantially equal in magnitude and inverted relative to the front end gain control value 326. For example, if front end gain control value is set as −2.1, then backend gain control value would be +2.1. That is, in response to receiving primary echo-suppressed signal 336 via the primary channel, back end gain adjuster 334 generates the back-end-gain-adjusted first audio output signal 306 by applying the back end gain control value 332 to the primary echo-suppressed signal 336. Similarly, in response to receiving secondary echo-suppressed signal 338 via the secondary channel, back end gain adjuster 340 generates the back-end-gain-adjusted second audio output signal 308 by applying the back end gain control value 332 to the secondary echo-suppressed signal 338.

When enabled or otherwise turned ON, PreEC 132 processes signals received via the primary and secondary channels. It is understood that when MS-ECS 130 does not include front end gain adjusters 328 and 330, PreEC 132 receives first audio input signal 302 via the primary channel and receives second audio input signal 304 via the secondary channel. In the embodiment shown, and for simplicity, first and second front-end-gain-adjusted audio input signals 322 and 324 will be respectively referred to as primary and secondary audio inputs to PreEC 132. Regarding the primary channel, PreEC 132 includes a primary finite impulse response (FIR) filter 342 that applies a set of primary fixed coefficients to the primary audio input 322 to generate a primary FIR-filtered audio signal 344. PreEC 132 includes a primary mixer 346 that subtracts the audio input signal 324 of the secondary channel from the primary FIR-filtered audio signal 344 to generate a PreEC-filtered audio signal 348 of the primary channel. PreEC 132 outputs the PreEC-filtered audio signal 348 to AEC 134 via the primary channel. PreEC 132 includes a secondary FIR filter 350 that applies a set of secondary fixed coefficients to the audio input signal 324 of the secondary channel to generate a secondary FIR-filtered audio signal 352. PreEC 132 includes a secondary mixer 354 that subtracts the primary audio input 322 from the secondary FIR-filtered audio signal 352 to generate a PreEC-filtered audio signal 356 of the secondary channel. PreEC 132 outputs the PreEC-filtered audio signal 356 to AEC 134 via the secondary channel. That is, the secondary channel of PreEC 132 includes analogous components that operate analogously to the components of the primary channel.

PreEC 132 is different from traditional pre-processing filtering. Each set of fixed coefficients of PreEC 132 is obtained by off-line training between two microphone echo signals. Each of the set of primary fixed coefficients and the set of secondary fixed coefficients is obtained by off-line training between primary microphone 112a and secondary microphone 112b. In light of the fact that the physical distances from speaker 114 to primary microphone 112a and secondary microphone 112b are fixed within the device enclosure 116 (FIG. 1), and the fact that the two microphone echoes are generated by the same reference signal, the two microphones are very relevant and correlated, therefore a fixed filter (i.e., containing a hard-coded set of fixed filtering coefficients) can be designed to cancel one microphone echo while the other microphone echo is used as reference signal. Both microphone echoes can be used as a reference signal for each other to design the fixed filter coefficients. The process of generating the set of primary fixed coefficients for the primary FIR filter 342 of the primary channel and generating the set of secondary fixed coefficients for the secondary FIR filter 350 of the secondary channel is described in greater detail below with reference to FIG. 5.

In the case of very large echo within the first and second audio input signals 302 and 304, PreEC 132 can pre-filter the majority of echo including some of nonlinear echo caused by the nonlinear echo path from speaker 114, amplifiers, and the analog front end (AFE). The PreEC-filtered audio signals 348 and 356 have a reduced amount of echo compared to the amount of echo in the first and second front-end-gain-adjusted audio input signals 322 and 324. However, the PreEC-filtered audio signals 348 and 356 have too much echo for VR engine 120 to successfully interpret spoken words, such as a trigger or command. As such, with PreEC enabled, the input to AEC 134 will have less nonlinear echo, allowing AEC 134 to focus more on canceling the echo generated by the dynamic echo path changes, which makes AEC 134 more efficient. AEC 134 further attenuates some of the echo, such as a predictable amount of the audio interference 126 that is created by the DPS 100 itself. AEC 134 filters dynamic echo path change due to variation of the physical space 118 relative to speaker(s) 114 or the N microphones 112. That is, AEC 134 handles the dynamic echo path change due to the device movement and environment change. For example, from the perspective of the DPS 100, a variation of the physical space occurs due to the fact that movement of the DPS 100 from one point (e.g., point A) to another (e.g., point B) causes a change of the environment (e.g., relative to point A, the arrangement of objects in the room vary with respect to point B). The echo-canceled signals output from AEC 134 may have residual echo, which may be too much echo for VR engine 120 to successfully interpret spoken words. Accordingly, DCES 136 further reduces the residual echo out from the pairs of echo-canceled signals 370-372 and 374-376 received from AEC 134, so that the final residual echo level (i.e., within output from DCES 136) will be minimized to have minimal or no impact on the performance of VR engine 120.

When enabled or otherwise turned ON, AEC 134 processes signals received via the primary and secondary channels. It is understood that when, PreEC 132 is disabled or otherwise turned OFF, AEC 134 receives first and second front-end-gain-adjusted audio input signals 322 and 324 via the primary and secondary channels respectively. In the example shown, PreEC-filtered audio signals 348 and 356 are the signals received by AEC 134 via the primary and secondary channels, respectively. For simplicity, components and operations of the primary channel of AEC 134 will be described in detail. Primary channel of the AEC 134 includes mixer 358, least mean squares based adaptive filter (AF) 360, and least mean squares filtering algorithm (LMS) 362 for the AF 360. It is understood that the secondary channel of AEC 134 includes analogous components (namely, mixer 364, AF 366, and LMS 368 for the AF 366) that operate analogously to the components of the primary channel.

Now referring to the primary channel, AF 360 and LMS 362 both receive speaker input 310. AF 360 uses speaker input 310 as a reference signal to generate and output echo signal 370, which is an adaptively filtered reference signal. Mixer 358 subtracts (i) PreEC-filtered audio signal 348 corresponding to primary microphone 112a from (ii) echo signal 370 generated by AF 360, and thereby mixer 358 generates error signal 372. The purpose of the LMS 362 is to find a set of filter coefficient that minimize the error signal 370 (i.e., achieves the LMS error), and accordingly, LMS 362 processes the error signal 372 to recursively bias AF 360. More particularly, LMS 362 recursively adjusts the filtering coefficients of AF 360 until the amount of echo remaining in the error signal 372 (which is outputted from mixer 358) meets an echo-minimization criteria. In certain embodiments, the echo-minimization criteria is met when LMS 362 determines that the echo signal 370 (which is outputted from AF 360) mimics or matches or otherwise converges with the error signal 372 (output from the mixer 358). AEC 134 generates two output signals for each channel input. In response to receiving first front-end-gain-adjusted audio input signal 322 via the primary channel, AEC 134 generates two output signals, including an error signal 372 and an echo signal 370. The error signal 372 is a main channel output signal that contains a combination of both the user speech and residual echo that AEC 134 could not cancel. The echo signal 372 simply contains echo. That is, AEC 134 generates two output signals per channel input, such that the secondary channel of AEC 134 provides error signal 374 and an echo signal 376.

DCES 136 receives an audio echo signal and a desired audio signal from AEC 134 via each of the primary and secondary channels. DCES 136 includes a DCES processing block per channel, namely, for each of the primary and secondary channels. Each DCES processing block includes a speech channel input, a reference echo channel input, and an echo-suppressed output. For example, as an input to its speech channel input, first DCES processing block 378 receives error signal 372 via the primary channel. As input to its reference echo channel input, first DCES processing block 378 receives echo signal 370 via the primary channel. First DCES processing block 378, in response to receiving the pair of echo-canceled signals 370-372 via the primary channel, generates primary echo-suppressed signal 336, which is output to VR engine 120 directly or alternatively via back end gain adjuster 334. Similarly, as an input to its speech channel input, second DCES processing block 380 receives error signal 374 via the secondary channel. As input to its reference echo channel input, second DCES processing block 380 receives echo signal 376 via the secondary channel. Second DCES processing block 380, in response to receiving the pair of echo-canceled signals 374-376 via the secondary channel, generates secondary echo-suppressed signal 338, which is output to VR engine 120 directly or alternatively via back end gain adjuster 340. DCES 136 (including, each respective DCES processing block 378, 380) suppresses echo by spectrum subtraction methodology, as described in commonly owned U.S. patent application Ser. No. 15/921,555, which patent document is hereby incorporated by reference in its entirety.

Figure 4A:
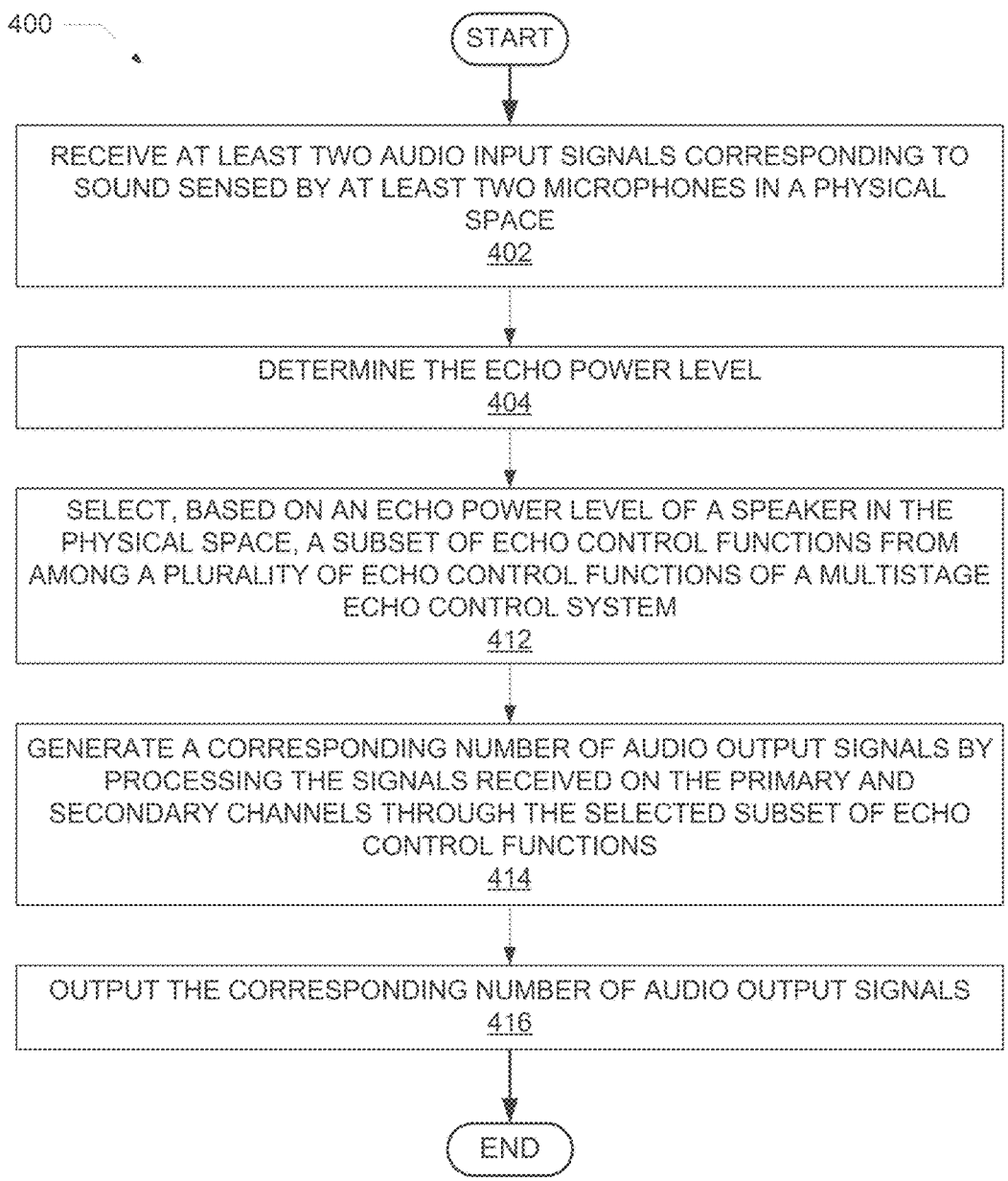
FIG. 4A provides a flowchart illustrating a method for controlling echo of a voice recognition system, in accordance with one or more embodiments of this disclosure.

With reference now to FIG. 4A, there is illustrated a flowchart illustrating a method 400 for controlling echo of a voice recognition system, in accordance with one or more embodiments of this disclosure. Aspects of the method 400 are described with reference to the components of FIGS. 1 through 3. Several of the processes of the method provided in FIG. 4A can be implemented by a processor (e.g., processor(s) 104) executing software code of MS-ECS 130 within a data processing system (e.g., DPS 100 or mobile device 200). The method processes described in FIG. 4A are generally described as being performed by MS-ECS 130 which uses other components of DPS 100.

Method 400 commences at the start block, then proceeds to block 402. At block 402 of the method, MS-ECS 130 receives at least two audio input signals corresponding to sound sensed by at least two microphones in a physical space. For example, as shown in FIG. 3, MS-ECS 130 receives N audio input signals, including first audio input signal 302 and second audio input signal 304 as a pair. At block 404 of the method, MS-ECS 130 determines the echo power level of a speaker in the physical space. For example, as shown in FIG. 3, MS-ECS 130 determines the echo power level of speaker(s) 114 in the physical space 118.

Figure 7:
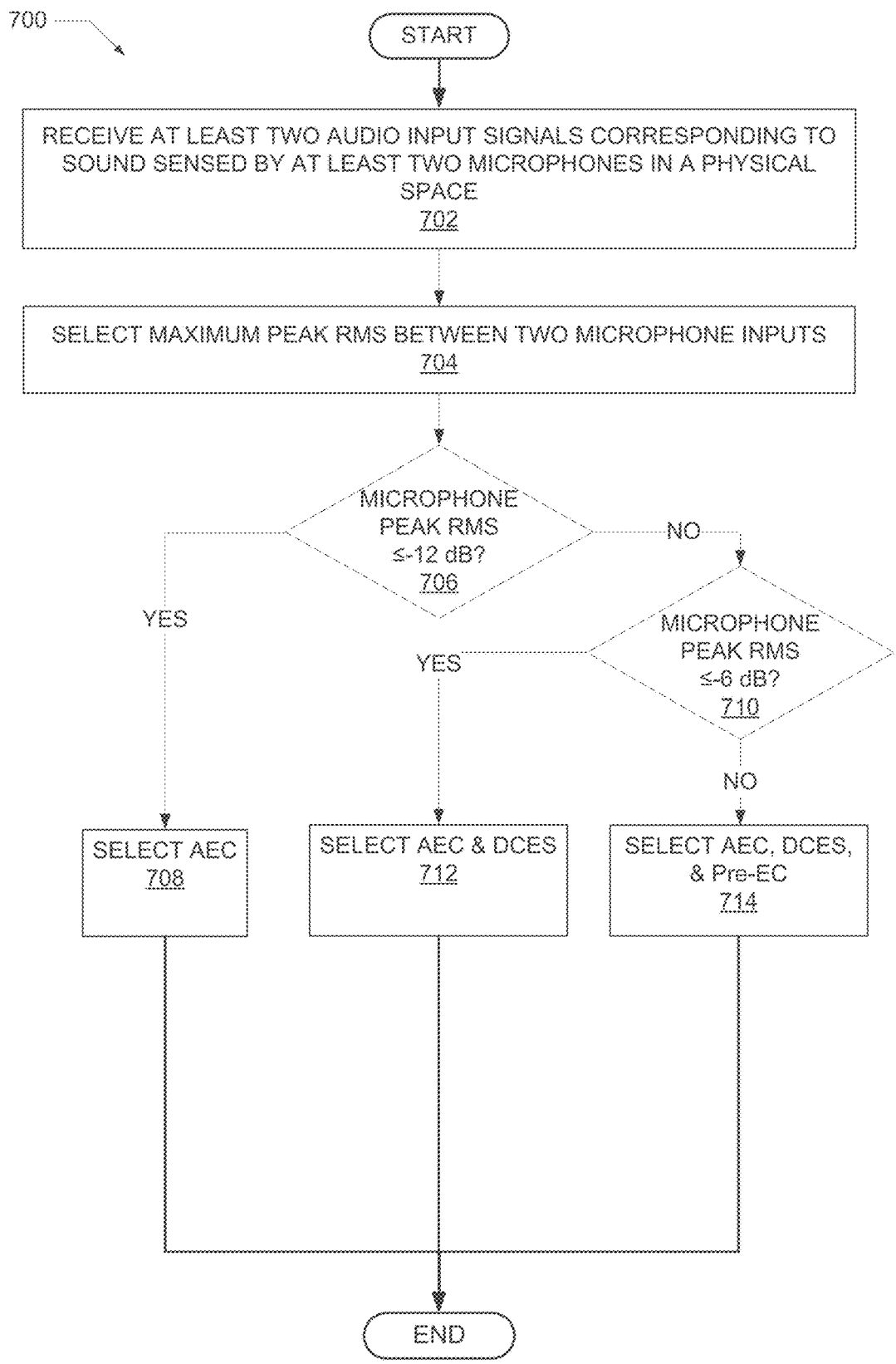
FIG. 7 provides a flowchart illustrating a method for selecting a subset of echo control functions through which a multistage echo control system processes audio input signals, in accordance with one or more embodiments of this disclosure.

At block 412 of the method, MS-ECS 130 selects, based on an echo power level of a speaker in the physical space 118, a subset of echo control functions from among a plurality of echo control functions of a multistage echo control system. As an example implementation of block 412, method 700 of FIG. 7 provides details of selecting a subset of echo control functions through which an MS-ECS processes audio input signals. In block 412, in response to a determination that the echo power level is within a respective predetermined low range, medium range, or high range of RMS values, processor 104 selects one, two, or three echo control functions through which the signals received on the primary and secondary channels will be processed. Flag control signal(s) 320 enables (e.g., turns ON) the selected echo control function(s). For example, MS-ECS 130 can select one subset from among the various subsets 1-3 shown in Table 1 of this disclosure, and the selection is based on the echo power level. In response to a determination that the echo power level is within a predetermined low range of RMS values, MS-ECS 130 selects the AEC 134 as the subset of echo control functions through which the signals received on the primary and secondary channels will be processed. Flag control signal(s) 320 enables (e.g., turns ON) the selected echo control function. In response to a determination that the echo power level is within a predetermined medium range of RMS values, MS-ECS 130 selects the AEC 134 and DCES 136 as the subset of echo control functions through which the signals received on the primary and secondary channels will be processed. Flag control signal(s) 320 enables (e.g., turns ON) the selected echo control functions. In response to a determination that the echo power level is within a predetermined high range of RMS values, MS-ECS 130 selects the PreEC 132, AEC 134, and DCES 136 as the subset of echo control functions through which the signals received on the primary and secondary channels will be processed. Flag control signal(s) 320 enables (e.g., turns ON) the selected echo control functions. In some embodiments, MS-ECS 130 can receive an echo property that characterizes the speaker input 310. MS-ECS 130 can also use the received echo property as a basis for selecting which table of subsets (e.g., from among multiple tables (Table 1 and Table 2)) corresponds to the received echo property (i.e., a specific use case), and then select one subset of echo control functions from the selected table.

At block 414 of the method, MS-ECS 130 generates a corresponding number (i.e., N) of audio output signals by processing the signals received on the primary and secondary channels through the selected subset of echo control functions. For example, as shown in FIG. 3, when the subset of echo control functions includes three echo control functions, MS-ECS 130 generates N audio output signals by processing the first and second audio input signals 302 and 304 through PreEC 132, processing PreEC-filtered audio signals 348 and 356 through AEC 134, and processing two pairs of echo-canceled signals 370-372 and 374-376 through DCES 136.

At block 416 of the method, MS-ECS 130 outputs the corresponding number of audio output signals 306 and 308. Consequently, VR engine 120 can process the audio output signals received from MS-ECS 130 and successfully interpret spoken words sensed by the microphone(s) 112.

Figure 4B:
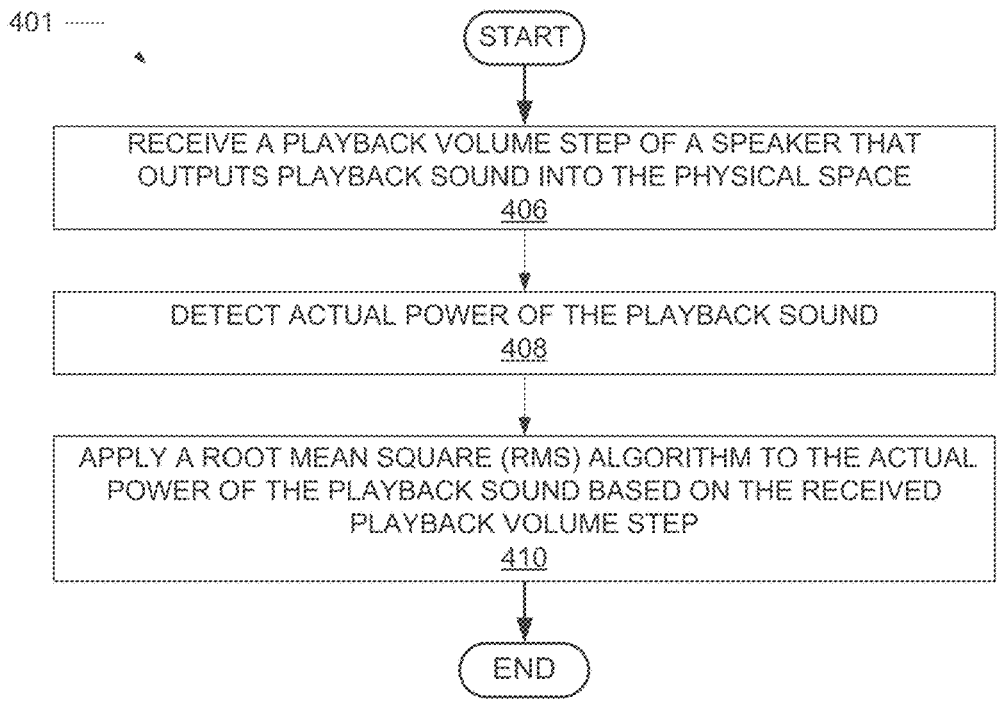
FIG. 4B provides a flowchart illustrating a method for determining the echo power level of a speaker in a physical space.

With reference now to FIG. 4B, there is illustrated a flowchart illustrating a method 401 for determining the echo power level of a speaker in a physical space. Aspects of the method 401 are described with reference to the components of FIGS. 1 through 3. The method processes described in FIG. 4B are generally described as being performed by MS-ECS 130, which determines the echo power level by using RMS Detector Front and Back Gain Controller 316. Method 401 can be a more detailed example of block 404 of FIG. 4A at which the echo power level is determined.

Method 401 commences at the start block, where the MS-ECS 130 initiates a process to determine the echo power level. At block 406, the MS-ECS 130 (via RMS Detector Front and Back Gain Controller 316) receives a playback volume step 314 of a speaker 114 that outputs playback sound 128 into the physical space 118. Additionally, at block 408, MS-ECS 130 (via RMS Detector Front and Back Gain Controller 316) detects actual power of the playback sound. For example, RMS Detector Front and Back Gain Controller 316 detects the actual power (e.g., magnitude of the speaker input 310 relative to a reference volume level/SPL) of the playback of loud speaker input 310. At block 410, MS-ECS 130 (via RMS Detector Front and Back Gain Controller 316) applies an RMS algorithm to the actual power of the playback sound based on the received playback volume step 314. In some embodiments, the process to determine the echo power level is completed at block 410.

Figure 4C:
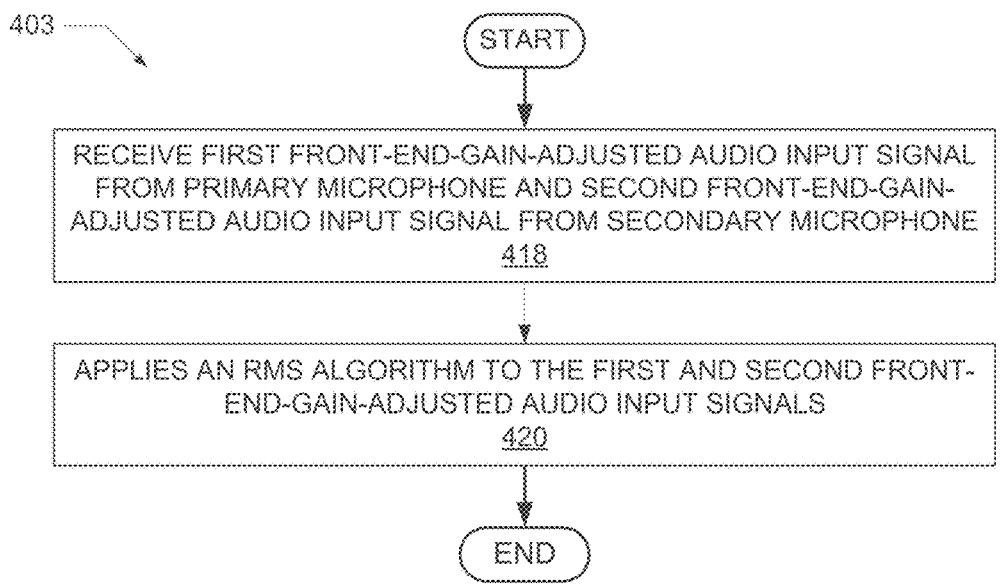
FIG. 4C provides a flowchart illustrating another method for determining the echo power level of a speaker in a physical space.

With reference now to FIG. 4C, there is illustrated a flowchart illustrating a method 403 for determining the echo power level of a speaker in a physical space. Aspects of the method 403 are described with reference to the components of FIGS. 1 through 3. The method processes described in FIG. 4C are generally described as being performed by MS-ECS 130 using RMS Detector Echo Processing Flag Controller 318. Method 403 can be a more detailed example of block 404 of FIG. 4A at which the echo power level is determined.

Method 403 commences at the start block, where the MS-ECS 130 initiates a process to determine the echo power level. At block 418, MS-ECS 130 (via RMS Detector Echo Processing Flag Controller 318) receives first front-end-gain-adjusted audio input signal 322 from primary microphone 112*a* that detected playback sound 128 projected into the physical space 118, and MS-ECS 130 receives second front-end-gain-adjusted audio input signal 324 from secondary microphone 112*b* that detected playback sound 128 projected into the physical space 118. At block 420, MS-ECS 130 (via RMS Detector Echo Processing Flag Controller 318) applies an RMS algorithm to the first and second front-end-gain-adjusted audio input signals 322 and 324. As an example, the RMS algorithm applied can be selecting a maximum peak RMS value, as shown in block 704 of FIG. 7. In some embodiments, the result of the application of the RMS algorithm to the first and second front-end-gain-adjusted audio input signals becomes the determined echo power level, and accordingly, the process to determine the echo power level is completed at block 420.

Figure 5:
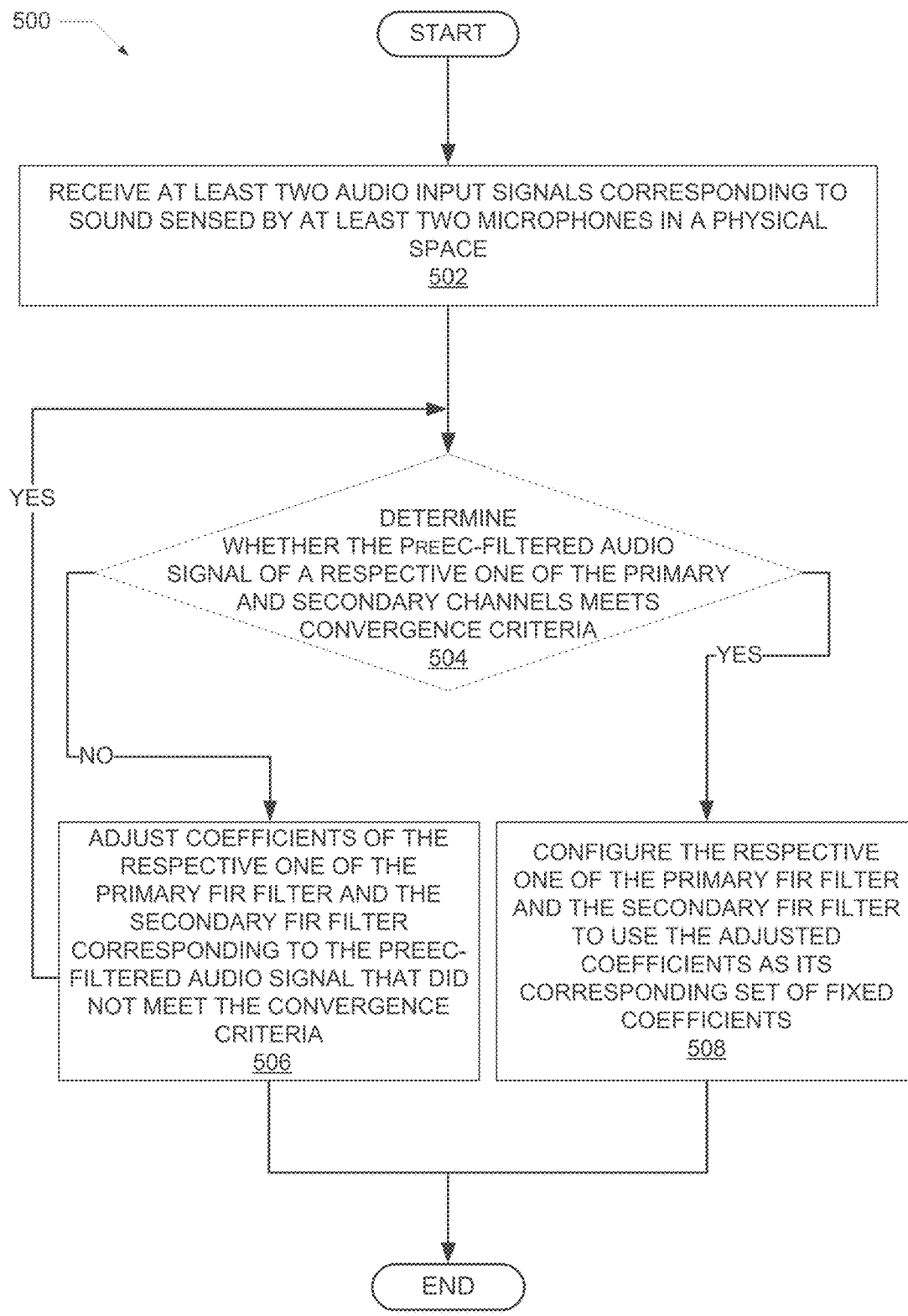
FIG. 5 provides a flowchart illustrating a method for generating a set of fixed coefficients for the finite impulse response (FIR) filter of each channel of a pre-echo control (PreEC) filtering type of echo control function, in accordance with one or more embodiments of this disclosure.

With reference now to FIG. 5, there is illustrated a flowchart illustrating a method for generating a set of fixed coefficients for the finite impulse response (FIR) filter of each channel of a pre-echo control (PreEC) filtering type of echo control function, in accordance with one or more embodiments of this disclosure. Aspects of the method 500 are described with reference to the components of FIGS. 1 through 3. Several of the processes of the method provided in FIG. 5 can be implemented by a processor (e.g., processor(s) 104) executing software code of MS-ECS 130 within a data processing system (e.g., DPS 100 or mobile device 200). The method processes described in FIG. 5 are generally described as being performed by MS-ECS 130 which uses other components of DPS 100.

Method 500 commences at the start block, then proceeds to block 502. It is understood that at the start block, MS-ECS 130 is set to a mode for offline training of PreEC 132, in which PreEC 132 is enabled to process N audio input signals (whether or not adjusted by front end gain adjusters) received via the primary and secondary channels. During offline training, none of the sound in the physical space 118 is generated by the user 117, as such, the first and second audio input signals 302 and 304 are echo only signals. That is, during offline training, the first and second audio input signals 302 and 304 represent audio interference 126.

At block 502, PreEC 132 receives N audio input signals, which the N microphones 112 generated and outputted in response to sensing speaker output 128 in physical space 118. More particularly, primary FIR filter 342 receives first audio input signal 302, which is generated by primary microphone 112*a*, via the primary channel. At the same time, secondary FIR filter 350 receives second audio input signal 304, which is generated by secondary microphone 112*b*, via the secondary channel. Each FIR filter of the PreEC 132 is configured to generate, in response to receiving an audio input signal, an FIR-filtered audio signal by applying coefficients of that FIR filter to the audio input signal.

At decision block 504 of the method, processor 104 determines whether the PreEC-filtered audio signal of a respective one of the primary and secondary channels meets convergence criteria. For example, as shown in FIG. 3, processor 104 determines whether a PreEC-filtered audio signal 348 of the primary channel meets convergence criteria, as well as determines whether a PreEC-filtered audio signal 356 of the secondary channel meets the convergence criteria. In determining whether PreEC-filtered audio signal 348 of the primary channel meets convergence criteria, primary FIR filter 342 generates a primary FIR-filtered audio signal 344, using an initial set of filtering coefficients (e.g., filtering coefficients set to zero values). In order to minimize the difference between PreEC-filtered audio signal 348 and its reference signal (i.e., second audio input signal 304, 324), a LMS adaptive filter algorithm is applied to recursively adjust primary FIR filter 342, using second audio input signal 304, 324 as a reference signal (i.e., noise source) and using the first audio input signal 302, 322 as a primary input signal (e.g., signal source). Likewise, in determining whether PreEC-filtered audio signal 356 of the secondary channel meets convergence criteria, secondary FIR filter 350 generates a secondary FIR-filtered audio signal 352, using an initial set of filtering coefficients (e.g., filtering coefficients set to zero values). In order to minimize the difference between PreEC-filtered audio signal 356 and its reference signal (i.e., first audio input signal 302, 322), a LMS adaptive filter algorithm is applied to recursively adjust second FIR filter 350, using first audio input signal 302, 322 as a reference signal (i.e., noise source) and using the second audio input signal 304, 324 as a secondary input signal (e.g., signal source).

At block 506, in response to a determination that a PreEC-filtered audio signal of a respective one of the primary and secondary channels does not meet convergence criteria, processor 104 adjusts coefficients of the respective one of the primary FIR filter and the secondary FIR filter corresponding to the PreEC-filtered audio signal that did not meet the convergence criteria. For example, if the LMS adaptive filter algorithm adjusted primary FIR filter 342 such that the difference between PreEC-filtered audio signal 348 and its reference signal is reduced, the method recursively returns to block 504, where the LMS adaptive filter algorithm is applied to recursively adjust primary FIR filter 342. As another example, if the LMS adaptive filter algorithm adjusted secondary FIR filter 350 such that the difference between PreEC-filtered audio signal 352 and its reference signal is reduced, the method recursively returns to block 504, where the LMS adaptive filter algorithm is applied to recursively adjust secondary FIR filter 350.

At block 508, in response to a determination that the PreEC-filtered audio signal 348, 356 of the respective primary and secondary channels meets convergence criteria, processor 104 configures the respective one of the primary FIR filter and the secondary FIR filter to use the adjusted coefficients as its corresponding set of fixed coefficients. For example, in response to a determination that the PreEC-filtered audio signal 348 of the primary channel meets convergence criteria, processor 104 configures (e.g., hard codes) the primary FIR filter 342 to use the adjusted coefficients (that caused primary FIR filter 342 to meet the convergence criteria) as the set of fixed coefficients of the primary FIR filter 342. As another example, in response to a determination that the PreEC-filtered audio signal 356 of the secondary channel meets convergence criteria, processor 104 configures (e.g., hard codes) the second FIR filter 350 to use the adjusted coefficients (that caused secondary FIR filter 350 to meet the convergence criteria) as the set of fixed coefficients of the secondary FIR filter 350. As an example, a convergence criterion could be met when the difference between PreEC-filtered audio signal 348 and its reference signal is minimized, or when the difference between PreEC-filtered audio signal 352 and its reference signal is minimized, or both.

Figure 6:
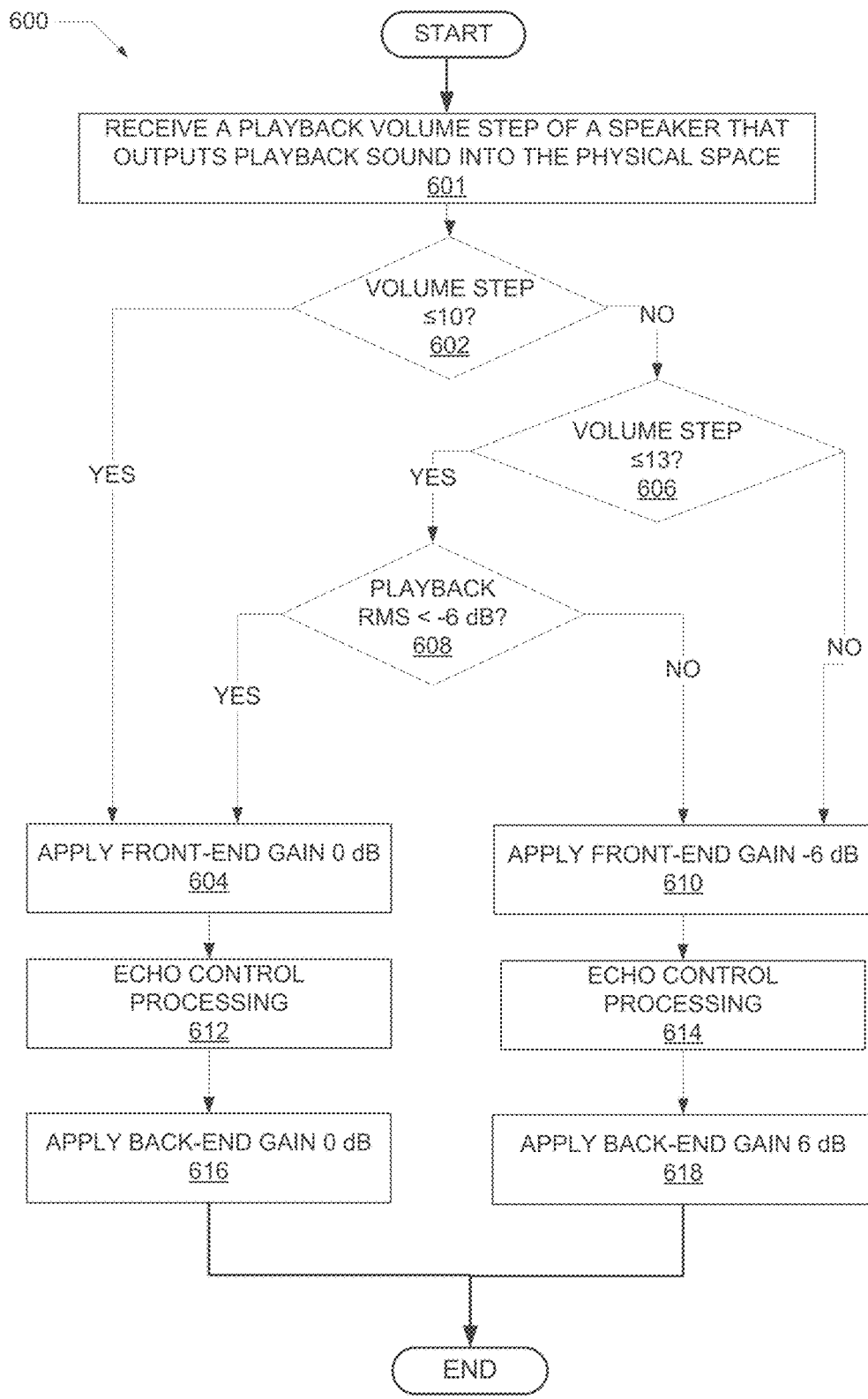
FIG. 6 provides a flowchart illustrating a method for controlling front-end gain and back-end gain of a pre-selectable and dynamic configurable multistage echo control system for large range levels of acoustic echo, in accordance with one or more embodiments of this disclosure.

With reference now to FIG. 6, there is illustrated a flowchart illustrating a method 600 for controlling front-end gain and back-end gain of a pre-selectable and dynamic configurable multistage echo control system for large range levels of acoustic echo, in accordance with one or more embodiments of this disclosure. Aspects of the method 600 are described with reference to the components of FIGS. 1 through 3. Several of the processes of the method provided in FIG. 6 can be implemented by a processor (e.g., processor(s) 104) executing software code of MS-ECS 130 within a data processing system (e.g., DPS 100 or mobile device 200). The method processes described in FIG. 6 are generally described as being performed by RMS Detector Front and Back Gain Controller 316.

Method 600 commences at the start block, then proceeds to block 601. At block 601, RMS Detector Front and Back Gain Controller 316 receives a playback volume step 314 of a speaker 114 that outputs playback sound 128 into the physical space 118. At decision block 602 of the method, RMS Detector Front and Back Gain Controller 316 determines whether the playback volume step 314 is less than or equal to a lower threshold value (e.g., volume step 10). The lower threshold value is a playback volume step that is between the lowest and highest playback volume steps of the DPS 100. If the playback volume step 314 is at most the lower threshold value, then the method 600 proceeds to block 604. If the playback volume step 314 is greater than the lower threshold value, then the method 600 proceeds to decision block 606.

At block 604, RMS Detector Front and Back Gain Controller 316 applies a front-end gain control value of 0 decibels (dB), in response to a determination that the playback volume step 314 is at most the lower threshold value. For example, as shown in FIG. 3, RMS Detector Front and Back Gain Controller 316 sets 0 dB as the front end gain control value 326, and provides that value to front end gain adjusters 328 and 330. Further, front end gain adjusters 328 and 330 generate first and second front-end-gain-adjusted audio input signals 322 and 324 by applying the 0 dB front-end gain control value. Method 600 proceeds from block 604 to block 612.

At decision block 606, in response to a determination that the playback volume step 314 is greater than the lower threshold value, RMS Detector Front and Back Gain Controller 316 determines whether the playback volume step 314 is at most an upper threshold value (e.g., volume step 13). The upper threshold value is a playback volume step that is between the lower threshold value and highest playback volume steps of the DPS 100. If the playback volume step 314 is at most the upper threshold value, then the method 600 proceeds to decision block 608. If the playback volume step 314 is greater than the upper threshold value, then the method 600 proceeds to block 610.

At decision block 608, in response to a determination that the playback volume step 314 is at most the upper threshold value and greater than lower threshold value, RMS Detector Front and Back Gain Controller 316 determines whether the peak RMS value of actual power of speaker input 310 is less than a threshold playback RMS value (e.g., negative six decibels (−6 dB)). If the peak RMS value of actual power of speaker input 310 is less than the threshold playback RMS value (e.g., −6 dB), then method 600 proceeds to block 604. At block 604, RMS Detector Front and Back Gain Controller 316 applies a front-end gain control value of 0 decibels (dB), in response to the determination that both the peak RMS value of actual power of speaker input 310 is less than the threshold playback RMS value (e.g., −6 dB) and the playback volume step 314 is at most the upper threshold value and greater than the lower threshold value. On the other hand, if the peak RMS value of actual power of speaker input 310 is at least (i.e., greater than or equal to) the threshold playback RMS value (e.g., −6 dB), then method 600 proceeds to block 610.

At block 610, RMS Detector Front and Back Gain Controller 316 applies a front-end gain control value of the threshold playback RMS value (e.g., negative six decibels (−6 dB)), either in response to a determination that the playback volume step 314 is greater than the upper threshold value or in response to a determination that both the peak RMS value of actual power of speaker input 310 is at least the threshold playback RMS value (e.g., −6 dB) and the playback volume step 314 is at most the upper threshold value and greater than the lower threshold value. For example, as shown in FIG. 3, RMS Detector Front and Back Gain Controller 316 sets the threshold playback RMS value (e.g., −6 dB) as the front end gain control value 326, and provides the value to front end gain adjusters 328 and 330. Further, front end gain adjusters 328 and 330 generate first and second front-end-gain-adjusted audio input signals 322 and 324 by applying the threshold playback RMS value (e.g., −6 dB) front-end gain control value. The method 600 proceeds from block 610 to block 614.

At blocks 612 and 614, echo control processing is performed by the plurality of echo control functions (i.e., PreEC 132, AEC 134, and DCES 136) of MS-ECS 130. For example, as shown in FIG. 3, MS-ECS 130 process the first and second front-end-gain-adjusted audio input signals 322 and 324 through a selected subset of the plurality of echo control functions, in order to generate primary and secondary echo-suppressed signals 336 and 338. Method 600 proceeds from block 612 to block 616. At block 616, RMS Detector Front and Back Gain Controller 316 applies a back-end gain control value 332 of zero decibels (0 dB). Note the back-end gain control value 332 applied in block 616 is equal in magnitude and inverted relative to the front end gain control value 326 applied in block 604. Method 600 then ends.

The method 600 proceeds from block 614 to block 618. At block 618, RMS Detector Front and Back Gain Controller 316 applies a back-end gain control value 332 of positive six decibels (6 dB). Note the back-end gain control value 332 applied in block 618 is equal in magnitude and inverted relative to the front end gain control value 326 applied in block 610. Method 600 then ends.

With reference now to FIG. 7, there is illustrated a flowchart illustrating a method 700 for selecting a subset of echo control functions through which a multistage echo control system processes audio input signals, in accordance with one or more embodiments of this disclosure. Aspects of the method 700 are described with reference to the components of FIGS. 1 through 3. Method 700 can be an example implementation of block 412 of FIG. 4A by providing details of selecting a subset of echo control functions (from among a plurality of echo control functions) through which an MS-ECS processes audio input signals. Several of the processes of the method provided in FIG. 7 can be implemented by a processor (e.g., processor(s) 104) executing software code of MS-ECS 130 within a data processing system (e.g., DPS 100 or mobile device 200). The method processes described in FIG. 7 are generally described as being performed by RMS Detector Echo Processing Flag Controller 318.

Method 700 commences at the start block, then proceeds to block 702. At block 702, RMS Detector Echo Processing Flag Controller 318 receives at least two audio input signals corresponding to sound sensed by at least two microphones in a physical space. For example, as shown in FIG. 3, RMS Detector Echo Processing Flag Controller 318 receives a pair of audio input signals, including first and second front-end-gain-adjusted audio input signals 322 and 324. As another example, RMS Detector Echo Processing Flag Controller 318 can receive first audio input signal 302 and second audio input signal 304 as a pair.

At block 704, RMS Detector Echo Processing Flag Controller 318 selects the maximum peak RMS value between two microphone inputs. Specifically, RMS Detector Echo Processing Flag Controller 318 determines the peak RMS value of first front-end-gain-adjusted audio input signals 322, determines the peak RMS value of second front-end-gain-adjusted audio input signals 324, compares the two peak RMS values, and selects the maximum peak RMS value from among the two peak RMS values.

At decision block 706, RMS Detector Echo Processing Flag Controller 318 determines whether the maximum peak RMS value is at most (i.e., less than or equal to) a lower threshold RMS value (e.g., negative twelve decibels (−12 dB)). If the maximum peak RMS value is at most the lower threshold RMS value (e.g., −12 dB), then the method 700 proceeds to block 708. If the maximum peak RMS value exceeds the lower threshold RMS value (e.g., −12 dB), then the method 700 proceeds to decision block 710.

At block 708, in response to a determination that the maximum peak RMS value does not exceed the lower threshold RMS value (e.g., −12 dB), RMS Detector Echo Processing Flag Controller 318 selects AEC 134 as the subset of echo control functions that are enabled or otherwise turned ON by flag control signal(s) 320. Specifically, RMS Detector Echo Processing Flag Controller 318 selects, based on the maximum peak RMS value (e.g., echo power level of a speaker in the physical space 118), AEC 134 as the subset of echo control functions from among a plurality of echo control functions of a multistage echo control system. For example, RMS Detector Echo Processing Flag Controller 318 determines that the echo power level is within a predetermined low range of RMS values. According to the selection at block 708, MS-ECS 130 processes the pair of audio input signals 302, 322 and 304, 324 received (at block 702) by RMS Detector Echo Processing Flag Controller 318 through AEC 134. The method 700 proceeds from block 708 to the end block. As an example, the end block of method 700 could proceed to block 414 of FIG. 4A.

At decision block 710, in response to a determination that the maximum peak RMS value exceeds the lower threshold RMS value (e.g., −12 dB), RMS Detector Echo Processing Flag Controller 318 determines whether the maximum peak RMS value is at most an upper threshold RMS value (e.g., negative six decibels (−6 dB)). If the maximum peak RMS value exceeds the upper threshold RMS value (e.g., −6 dB), then the method 700 proceeds to block 714.

At block 712, in response to a determination that the maximum peak RMS value does not exceed the upper threshold RMS value (e.g., −6 dB), RMS Detector Echo Processing Flag Controller 318 selects the AEC 134 and DCES 136 as the subset of echo control functions that are enabled or otherwise turned ON by flag control signal(s) 320. Specifically, RMS Detector Echo Processing Flag Controller 318 selects, based on the maximum peak RMS value (e.g., echo power level of a speaker in the physical space 118), the AEC 134 and DCES 136 as the subset of echo control functions from among a plurality of echo control functions of a multistage echo control system. For example, RMS Detector Echo Processing Flag Controller 318 determines that the echo power level is within a predetermined medium range of RMS values. According to the selection at block 712, MS-ECS 130 processes the pair of audio input signals 302, 322 and 304, 324 received (at block 702) by RMS Detector Echo Processing Flag Controller 318 through AEC 134 followed by DCES 136. The method 700 proceeds from block 712 to the end block.

At block 714, in response to a determination that the maximum peak RMS value exceeds the upper threshold RMS value (e.g., −6 dB), RMS Detector Echo Processing Flag Controller 318 selects each of Pre-EC 132, AEC 134, and DCES 136 as the subset of echo control functions that are enabled or otherwise turned ON by flag control signal(s) 320. Specifically, RMS Detector Echo Processing Flag Controller 318 selects, based on the maximum peak RMS value (e.g., echo power level of a speaker in the physical space 118), Pre-EC 132, AEC 134, and DCES 136 as the subset of echo control functions from among a plurality of echo control functions of a multistage echo control system. For example, RMS Detector Echo Processing Flag Controller 318 determines that the echo power level is within a predetermined high range of RMS values. According to the selection at block 714, MS-ECS 130 processes the pair of audio input signals 302, 322 and 304, 324 received (at block 702) by RMS Detector Echo Processing Flag Controller 318 through Pre-EC 132, followed by AEC 134, followed by DCES 136. The method 700 proceeds from block 714 to the end block.

In the above-described flowcharts of FIGS. 4, 5, 6, and 7, one or more of the method processes may be embodied in a computer readable device containing computer readable code such that a series of steps are performed when the computer readable code is executed on a computing device. In some implementations, certain steps of the methods are combined, performed simultaneously or in a different order, or perhaps omitted, without deviating from the scope of the disclosure. Thus, while the method steps are described and illustrated in a particular sequence, use of a specific sequence of steps is not meant to imply any limitations on the disclosure. Changes may be made with regards to the sequence of steps without departing from the spirit or scope of the present disclosure. Use of a particular sequence is therefore, not to be taken in a limiting sense, and the scope of the present disclosure is defined only by the appended claims.

Aspects of the present disclosure are described above with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. Computer program code for carrying out operations for aspects of the present disclosure may be written in any combination of one or more programming languages, including an object-oriented programming language, without limitation. These computer program instructions may be provided to a processor of a general purpose computer, special purpose computer, or other programmable data processing apparatus to produce a machine that performs the method for implementing the functions/acts specified in the flowchart and/or block diagram block or blocks. The methods are implemented when the instructions are executed via the processor of the computer or other programmable data processing apparatus.

As will be further appreciated, the processes in embodiments of the present disclosure may be implemented using any combination of software, firmware, or hardware.

Accordingly, aspects of the present disclosure may take the form of an entirely hardware embodiment or an embodiment combining software (including firmware, resident software, micro-code, etc.) and hardware aspects that may all generally be referred to herein as a "circuit," "module," or "system." Furthermore, aspects of the present disclosure may take the form of a computer program product embodied in one or more computer readable storage device(s) having computer readable program code embodied thereon. Any combination of one or more computer readable storage device(s) may be utilized. The computer readable storage device may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage device can include the following: a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a computer readable storage device may be any tangible medium that can contain, or store a program for use by or in connection with an instruction execution system, apparatus, or device.

Where utilized herein, the terms "tangible" and "non-transitory" are intended to describe a computer-readable storage medium (or "memory") excluding propagating electromagnetic signals; but are not intended to otherwise limit the type of physical computer-readable storage device that is encompassed by the phrase "computer-readable medium" or memory. For instance, the terms "non-transitory computer readable medium" or "tangible memory" are intended to encompass types of storage devices that do not necessarily store information permanently, including, for example, RAM. Program instructions and data stored on a tangible computer-accessible storage medium in non-transitory form may afterwards be transmitted by transmission media or signals such as electrical, electromagnetic, or digital signals, which may be conveyed via a communication medium such as a network and/or a wireless link.

While the disclosure has been described with reference to example embodiments, it will be understood by those skilled in the art that various changes may be made and equivalents may be substituted for elements thereof without departing from the scope of the disclosure. In addition, many modifications may be made to adapt a particular system, device, or component thereof to the teachings of the disclosure without departing from the scope thereof. Therefore, it is intended that the disclosure not be limited to the particular embodiments disclosed for carrying out this disclosure, but that the disclosure will include all embodiments falling within the scope of the appended claims.

The description of the present disclosure has been presented for purposes of illustration and description, but is not intended to be exhaustive or limited to the disclosure in the form disclosed. Many modifications and variations will be apparent to those of ordinary skill in the art without departing from the scope of the disclosure. The described embodiments were chosen and described in order to best explain the principles of the disclosure and the practical application, and to enable others of ordinary skill in the art to understand the disclosure for various embodiments with various modifications as are suited to the particular use contemplated.

What is claimed is:

1. A method comprising:

receiving at least two audio input signals corresponding to sound sensed by at least two microphones in a physical space, wherein a first audio input signal of the at least two audio input signals is received on a primary channel, and each remaining audio input signal of the at least two audio input signals is received through a respective secondary channel;

selecting, by a processor, based on an echo power level of a speaker in the physical space, a subset of echo control functions from among a plurality of echo control functions of a multistage echo control system, wherein each echo control function among the plurality of echo control functions modifies the at least two audio input signals to reduce echo;

generating a corresponding number of audio output signals by processing the signals received on the primary and secondary channels through the selected subset of echo control functions; and outputting the corresponding number of audio output signals.

2. The method of claim 1, wherein the plurality of echo control functions comprises a pre-echo control filter (PreEC) that filters a nonlinear echo path caused by the speaker by applying a cross-filtering algorithm to the at least two audio input signals to, at least in part, generate the corresponding number of audio output signals, the PreEC comprising:

a primary finite impulse response (FIR) filter that applies a set of primary fixed coefficients to the audio input signal of the primary channel to generate a primary FIR-filtered audio signal;

a primary mixer that subtracts the audio input signal of the secondary channel from the primary FIR-filtered audio signal to generate a PreEC-filtered audio signal of the primary channel;

a secondary FIR filter that applies a set of secondary fixed coefficients to the audio input signal of the secondary channel to generate a secondary FIR-filtered audio signal; and a secondary mixer that subtracts the audio input signal of the primary channel from the secondary FIR-filtered audio signal to generate a PreEC-filtered audio signal of the secondary channel.

3. The method of claim 2, wherein the set of primary fixed coefficients and the set of secondary fixed coefficients are respectively generated by:

determining whether the PreEC-filtered audio signal of a respective one of the primary and secondary channels meets convergence criteria;

in response to a determination that the PreEC-filtered audio signal of the respective one of the primary and secondary channels does not meet the convergence criteria, iteratively adjusting coefficients of the respective one of the primary FIR filter and the secondary FIR filter corresponding to the PreEC-filtered audio signal that did not meet the convergence criteria until the PreEC-filtered audio signal of the respective one of the primary and secondary channels meets the convergence criteria; and in response to a determination that the PreEC-filtered audio signal of the respective one of the primary and secondary channels meets the convergence criteria, configuring the respective one of the primary FIR filter and the secondary FIR filter to use the adjusted coefficients as its corresponding set of fixed coefficients.

4. The method of claim 2, wherein the plurality of echo control functions further comprises:
an acoustic echo canceller (AEC) that filters dynamic echo path change due to variation of the physical space relative to at least one of the speaker and the set of N microphones, and
a dual channel echo suppressor (DCES) that reduces residual echo.

5. The method of claim 4, further comprising:
in response to a determination that the echo power level is within a predetermined low range of root mean square (RMS) values:
selecting the AEC as the subset of echo control functions; and
generating the corresponding number of audio output signals by processing the primary and secondary channels through the AEC to generate a pair of echo-canceled signals per channel, wherein each of the pairs of echo-canceled signals includes an error signal and an adaptive filter output signal.

6. The method of claim 4, further comprising:
in response to a determination that the echo power level is within a predetermined middle range of RMS values:
selecting the AEC and the DCES as the subset of echo control functions; and
generating the corresponding number of audio output signals by:
processing the primary and secondary channels through the AEC to generate a pair of echo-canceled signals per channel, wherein each of the pairs of echo-canceled signals includes an error signal and an adaptive filter output signal; and
processing each of the pairs of echo-canceled signals through a respective DCES processing block within the DCES stage to generate an echo-suppressed signal per channel.

7. The method of claim 4, further comprising:
in response to a determination that the echo power level is within a predetermined high range of RMS values:
selecting the PreEC, the AEC, and the DCES as the subset of echo control functions; and
generating the corresponding number of audio output signals by:
processing the primary and secondary channels through the PreEC to generate a PreEC-filtered audio signal for each of the primary and secondary channels;
processing the PreEC-filtered audio signal of each of the primary and secondary channels through the AEC to generate a pair of echo-canceled signals per channel, wherein each of the pairs of echo-canceled signals includes an error signal and an adaptive filter output signal; and
processing each of the pairs of echo-canceled signals through a respective DCES processing block within the DCES stage to generate an echo-suppressed signal per channel.

8. The method of claim 1, further comprising:
determining the echo power level by:
receiving a playback volume step of a speaker that outputs playback sound into the physical space;
detecting actual power of the playback sound; and
applying a root mean square (RMS) algorithm to the actual power of the playback sound based on the received playback volume step.

9. The method of claim 8, further comprising:
generating a front end gain control value based on the playback volume step and the actual power of the playback sound;
applying the front end gain control value to signals generated by the at least two microphones to prevent saturation of the primary and secondary channels; and
applying a back end gain control value to the corresponding number of audio output signals, wherein back end gain control value is substantially equal in magnitude and inverted relative to the front end gain control value.

10. A data processing device comprising:
at least two microphones that, in response to sensing sound in a physical space, generate at least two audio input signals;
a speaker that outputs playback sound into the physical space at an actual playback power based on a playback volume step of the speaker; and
a processor, operably coupled to the at least two microphones and the speaker, and which executes program code enabling the data processing system to:
receive at least two audio input signals corresponding to sound sensed by the at least two microphones, wherein a first audio input signal of the at least two audio input signals is received through a primary channel, and each remaining audio input signal of the at least two audio input signals is received through a respective secondary channel;
select, based on an echo power level of a speaker in the physical space, a subset of echo control functions from among a plurality of echo control functions of a multistage echo control system, wherein each echo control function among the plurality of echo control functions modifies the at least two audio input signals to reduce echo;
generate a corresponding number of audio output signals by processing the signals received through primary and secondary channels through the selected subset of echo control functions; and
output the corresponding number of audio output signals.

11. The data processing device of claim 10, wherein the plurality of echo control functions comprises a pre-echo control filter (PreEC) that filters a nonlinear echo path caused by the speaker by applying a cross-filtering algorithm to the at least two audio input signals to, at least in part, generate the corresponding number of audio output signals, the PreEC comprising:
a primary finite impulse response (FIR) filter that applies a set of primary fixed coefficients to the audio input signal of the primary channel to generate a primary FIR-filtered audio signal;
a primary mixer that subtracts the audio input signal of the secondary channel from the primary FIR-filtered audio signal to generate a PreEC-filtered audio signal of the primary channel;
a secondary FIR filter that applies a set of secondary fixed coefficients to the audio input signal of the secondary channel to generate a secondary FIR-filtered audio signal; and
a secondary mixer that subtracts the audio input signal of the primary channel from the secondary FIR-filtered audio signal to generate a PreEC-filtered audio signal of the secondary channel.

12. The data processing device of claim 11, wherein the set of primary fixed coefficients and the set of secondary fixed coefficients are respectively generated by the processor executing code to:

determine whether the PreEC-filtered audio signal of a respective one of the primary and secondary channels meets convergence criteria;

in response to a determination that the PreEC-filtered audio signal of the respective one of the primary and secondary channels does not meet the convergence criteria, iteratively adjust coefficients of the respective one of the primary FIR filter and the secondary FIR filter that corresponds to the PreEC-filtered audio signal that did not meet the convergence criteria until the PreEC-filtered audio signal of the respective one of the primary and secondary channels meets the convergence criteria; and in response to a determination that the PreEC-filtered audio signal of the respective one of the primary and secondary channels meets the convergence criteria, configure the respective one of the primary FIR filter and the secondary FIR filter to use the adjusted coefficients as the respective one of the set of primary fixed coefficients and the set of secondary fixed coefficients.

13. The data processing device of claim 11, wherein the plurality of echo control functions further comprises:

an acoustic echo canceller (AEC) that filters a dynamic echo path change due to variation of the physical space relative to at least one of the speaker and the set of N microphones, and a dual channel echo suppressor (DCES) that reduces residual echo.

14. The data processing device of claim 13, wherein the program code further enables the data processing system to:

in response to a determination that the echo power level is within a predetermined low range of root mean square (RMS) values:

select the AEC as the subset of echo control functions; and generate the corresponding number of audio output signals by:

processing the primary and secondary channels through the AEC to generate a pair of echo-canceled signals per channel, wherein each of the pairs of echo-canceled signals includes an error signal and an adaptive filter output signal.

15. The data processing device of claim 13, wherein the program code further enables the data processing system to:

in response to a determination that the echo power level is within a predetermined middle range of RMS values:

select the AEC and the DCES as the subset of echo control functions; and generate the corresponding number of audio output signals by:

processing the primary and secondary channels through the AEC to generate a pair of echo-canceled signals per channel, wherein each of the pairs of echo-canceled signals includes an error signal and an adaptive filter output signal; and processing each of the pairs of echo-canceled signals through a respective DCES processing block within the DCES stage to generate an echo-suppressed signal per channel.

16. The data processing device of claim 13, wherein the program code further enables the data processing system to:

in response to a determination that the echo power level is within a predetermined high range of RMS values:

select the PreEC, the AEC, and the DCES as the subset of echo control functions; and generate the corresponding number of audio output signals by:

processing the primary and secondary channels through the PreEC to generate a PreEC-filtered audio signal for each of the primary and secondary channels;

processing the PreEC-filtered audio signal of each of the primary and secondary channels through the AEC to generate a pair of echo-canceled signals per channel, wherein each of the pairs of echo-canceled signals includes an error signal and an adaptive filter output signal; and processing each of the pairs of echo-canceled signals through a respective DCES processing block within the DCES stage to generate an echo-suppressed signal per channel.

17. The data processing device of claim 10, wherein the program code further enables the data processing system to:

determine the echo power level by:

receiving a playback volume step of a speaker that outputs playback sound into the physical space;

detecting actual power of the playback sound; and applying a root mean square (RMS) algorithm to the actual power of the playback sound based on the received playback volume step.

18. The data processing device of claim 17, wherein the program code further enables the data processing system to:

generate a front end gain control value based on the playback volume step and the actual power of the playback sound;

apply the front end gain control value to signals generated by the at least two microphones to prevent saturation of the primary and secondary channels; and apply a back end gain control value to the corresponding number of audio output signals, wherein back end gain control value is substantially equal in magnitude and inverted relative to the front end gain control value.

19. A computer program product comprising:

a non-transitory computer readable storage device;

program code on the non-transitory computer readable storage device that when executed by a processor associated with a device, the program code enables the device to provide a functionality of:

receiving at least two audio input signals corresponding to sound sensed by at least two microphones in a physical space, wherein a first audio input signal of the at least two audio input signals is received through a primary channel, and each remaining audio input signal of the at least two audio input signals is received through a respective secondary channel;

selecting, based on an echo power level of a speaker in the physical space, a subset of echo control functions from among a plurality of echo control functions of a multistage echo control system, wherein each echo control function among the plurality of echo control functions modifies the at least two audio input signals to reduce echo;

generating a corresponding number of audio output signals by processing the signals received through primary and secondary channels through the selected subset of echo control functions; and outputting the corresponding number of audio output signals.

20. The computer program product of claim 19, wherein the plurality of echo control functions comprises a pre-echo control filter (PreEC) and the program code configures the device to perform the function of filtering, via the PreEC, a nonlinear echo path caused by the speaker by applying a cross-filtering algorithm to the at least two audio input signals to, at least in part, generate the corresponding number of audio output signals, the PreEC comprising:
   a primary finite impulse response (FIR) filter that applies a set of primary fixed coefficients to the audio input signal of the primary channel to generate a primary FIR-filtered audio signal;
   a primary mixer that subtracts the audio input signal of the secondary channel from the primary FIR-filtered audio signal to generate a PreEC-filtered audio signal of the primary channel;
   a secondary FIR filter that applies a set of secondary fixed coefficients to the audio input signal of the secondary channel to generate a secondary FIR-filtered audio signal; and
   a secondary mixer that subtracts the audio input signal of the primary channel from the secondary FIR-filtered audio signal to generate a PreEC-filtered audio signal of the secondary channel; and
   wherein the program code further configures the device to respectively generate the set of primary fixed coefficients and the set of secondary fixed coefficients by:

determining whether the PreEC-filtered audio signal of a respective one of the primary and secondary channels meets convergence criteria;
in response to a determination that the PreEC-filtered audio signal of the respective one of the primary and secondary channels does not meet the convergence criteria, iteratively adjusting coefficients of the respective one of the primary FIR filter and the secondary FIR filter that corresponds to the PreEC-filtered audio signal that did not meet the convergence criteria until the PreEC-filtered audio signal of the respective one of the primary and secondary channels meets the convergence criteria; and
in response to a determination that the PreEC-filtered audio signal of the respective one of the primary and secondary channels meets the convergence criteria, configuring the respective one of the primary FIR filter and the secondary FIR filter to use the adjusted coefficients as the respective one of the set of primary fixed coefficients and the set of secondary fixed coefficient.

* * * * *